(12) United States Patent
Akashika et al.

(10) Patent No.: US 7,707,225 B2
(45) Date of Patent: Apr. 27, 2010

(54) INFORMATION PROCESSING APPARATUS, INFORMATION PROCESSING METHOD, AND PROGRAM

(75) Inventors: Hideki Akashika, Tokyo (JP); Jun Ogishima, Tokyo (JP); Naofumi Hanaki, Kanagawa (JP)

(73) Assignee: FeliCa Networks, Inc., Tokyo (JP)

( * ) Notice: Subject to any disclaimer, the term of this patent is extended or adjusted under 35 U.S.C. 154(b) by 288 days.

(21) Appl. No.: 11/231,901

(22) Filed: Sep. 22, 2005

(65) Prior Publication Data
US 2006/0080322 A1 Apr. 13, 2006

(30) Foreign Application Priority Data
Oct. 8, 2004 (JP) ............................ 2004-295968

(51) Int. Cl.
*G06F 17/30* (2006.01)
(52) U.S. Cl. .............................. 707/785; 707/999.008; 707/999.01; 713/155; 713/168; 726/2; 726/3; 726/6; 726/18; 380/277; 380/278
(58) Field of Classification Search .................. 707/8, 707/9, 10; 713/155, 168; 726/2, 3, 6, 18; 380/277, 278
See application file for complete search history.

(56) References Cited

U.S. PATENT DOCUMENTS

| 4,386,233 | A  | * | 5/1983  | Smid et al. ................. 380/281 |
| 6,314,519 | B1 | * | 11/2001 | Davis et al. ................. 726/4 |
| 6,438,690 | B1 | * | 8/2002  | Patel et al. ................. 713/156 |
| 6,516,412 | B2 | * | 2/2003  | Wasilewski et al. ......... 713/168 |
| 6,658,568 | B1 | * | 12/2003 | Ginter et al. ................. 713/193 |
| 6,775,782 | B1 | * | 8/2004  | Buros et al. ................. 726/2 |
| 2002/0013898 | A1 | * | 1/2002 | Sudia et al. ................. 713/155 |
| 2002/0073309 | A1 | * | 6/2002 | Kurn et al. ................. 713/155 |
| 2003/0021417 | A1 | * | 1/2003 | Vasic et al. ................. 380/277 |
| 2003/0070080 | A1 | * | 4/2003 | Rosen ........................ 713/187 |
| 2003/0174844 | A1 | * | 9/2003 | Candelore .................... 380/277 |
| 2003/0233541 | A1 | * | 12/2003 | Fowler et al. ............... 713/155 |

FOREIGN PATENT DOCUMENTS

JP 2002-244756 8/2002

* cited by examiner

*Primary Examiner*—Isaac M Woo
*Assistant Examiner*—Syling Yen
(74) *Attorney, Agent, or Firm*—Oblon, Spivak, McClelland, Maier & Neustadt, L.L.P.

(57) ABSTRACT

An information processing apparatus configured to perform cryptographic processing in response to a request from a server transmitting encrypted information to control an integrated circuit chip includes a managing unit managing types of the cryptographic processing granted in accordance with requests; and an output unit performing predetermined cryptographic processing requested from a predetermined server succeeding in authentication, when the requested predetermined cryptographic processing has a granted type managed by the managing unit, to supply information concerning the processing result to the predetermined server as information to be transmitted to the integrated circuit chip to be controlled.

7 Claims, 20 Drawing Sheets

---

142

[Access Control List]
Valid period (expiration date) of access control list, limitation of the number of accesses (once, unlimited, etc.)

[Format Information]
Format name (ID)
Format information (area code, service code, key ID, key version number, etc.)

[Key Access Information]
Access right common to application and operator
Key ID, granted access (Read, Write, key change, creation of command execution right, etc.), valid period (expiration date), etc.

[Authentication Information for Application]
Application ID
Application authentication information (key information, cryptographic algorithm, public key certificate, etc.)
Information concerning list of area codes and service codes for authentication between secure chip and server
Cryptographic processing used (two-way/one-way authentication, creation of command execution right, command encryption, etc.)
Valid period (expiration date), etc.

[Authentication Information for Operator Access]
Operator ID
Information concerning operator authentication (key information, cryptographic algorithm, public key certificate, etc.)
Access behavior (registration, deletion, addition, reference, etc.)
Valid period (expiration date), etc.

[Access Control List]
Valid period (expiration date) of access control list, limitation of the number of accesses (once, unlimited, etc.)

[Format Information]
Format name (ID)
Format information (area code, service code, key ID, key version number, etc.)

[Key Access Information]
Access right common to application and operator
Key ID, granted access (Read, Write, key change, creation of command execution right, etc.), valid period (expiration date), etc.

[Authentication Information for Application]
Application ID
Application authentication information (key information, cryptographic algorithm, public key certificate, etc.)
Information concerning list of area codes and service codes for authentication between secure chip and server
Cryptographic processing used (two-way/one-way authentication, creation of command execution right, command encryption, etc.)
Valid period (expiration date), etc.

[Authentication Information for Operator Access]
Operator ID
Information concerning operator authentication (key information, cryptographic algorithm, public key certificate, etc.)
Access behavior (registration, deletion, addition, reference, etc.)
Valid period (expiration date), etc.

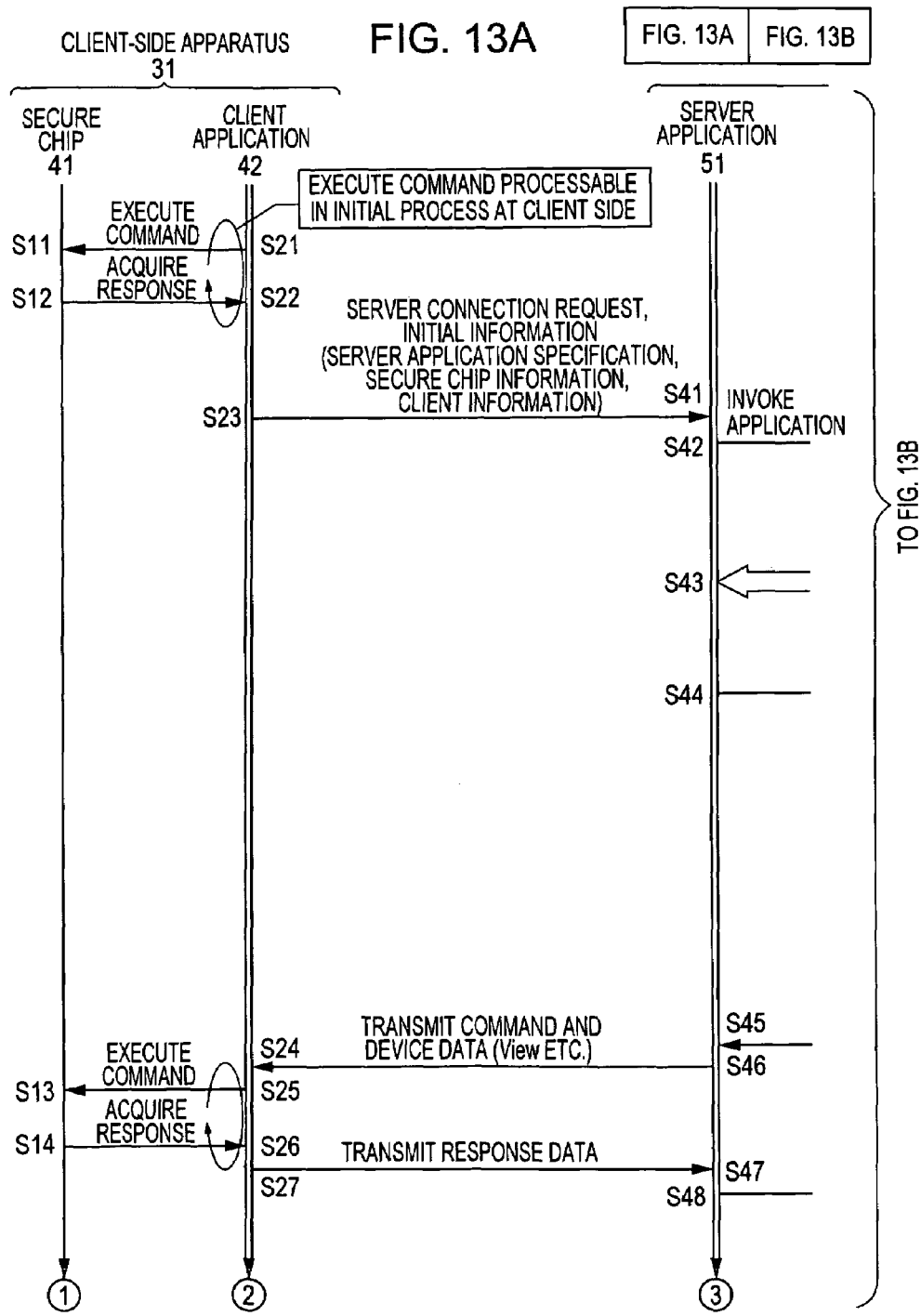

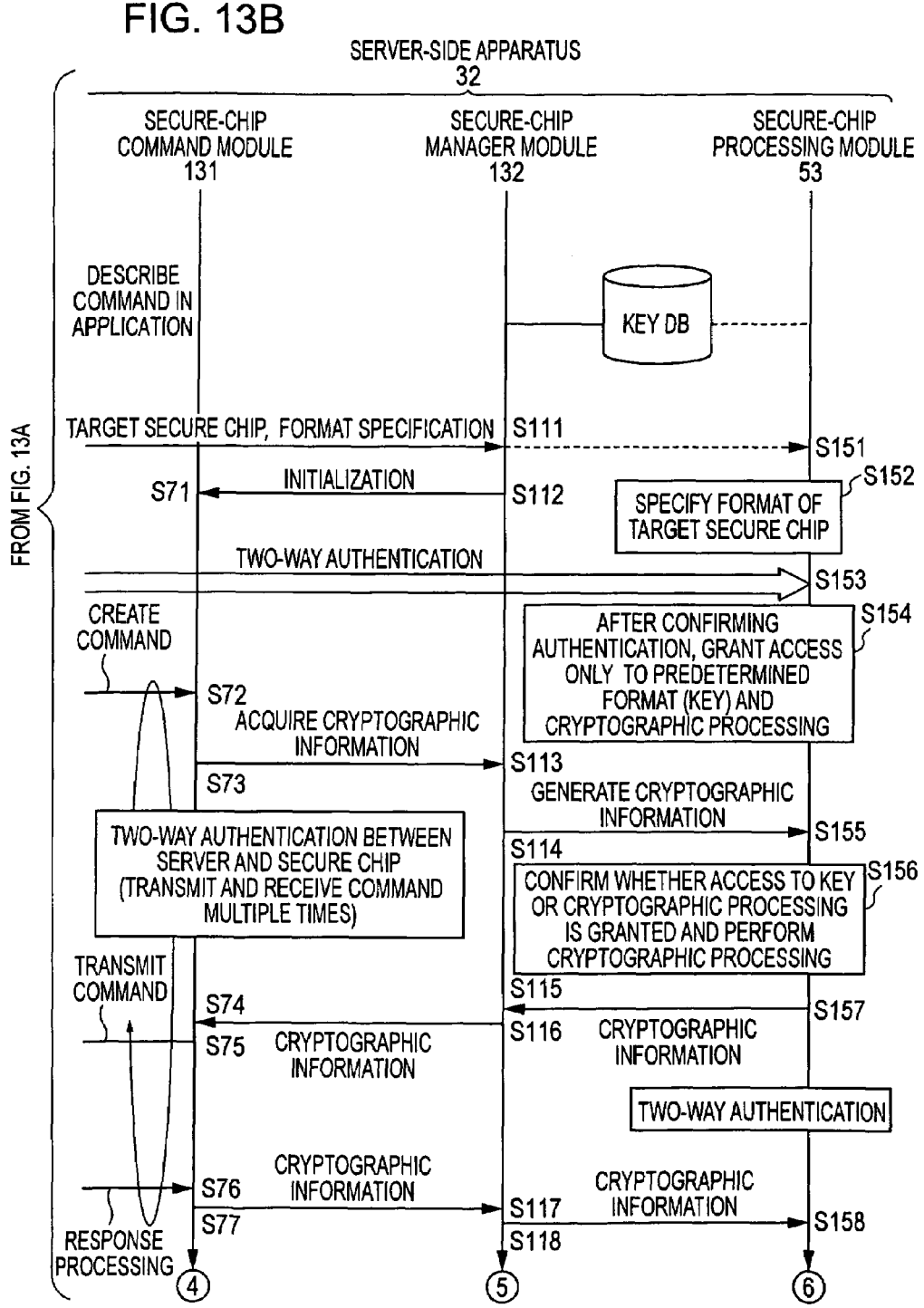

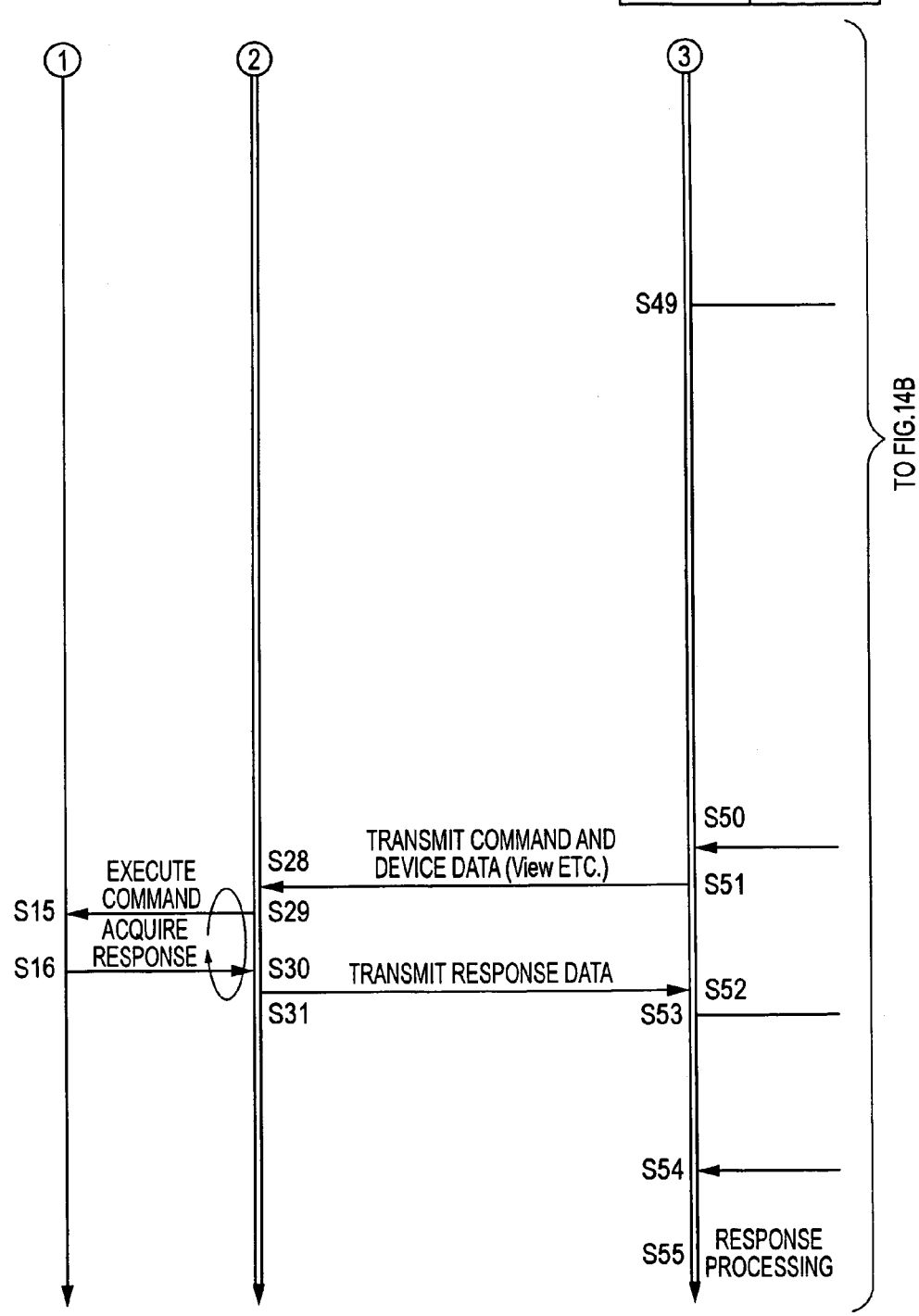

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2004-295968 filed in the Japanese Patent Office on Oct. 8, 2004, the entire contents of which are incorporated herein by reference.

BACKGROUND OF THE INVENTION

1. Field of the Invention

The present invention relates to information processing apparatuses, information processing methods, and programs. More particularly, the present invention relates to an information processing apparatus, an information processing method, and a program which are capable of performing a variety of cryptographic processing even in response to a request from a server in a different environment while ensuring the security.

2. Description of the Related Art

In recent years, charging contactless IC chips, such as FeliCa®, embedded in credit cards or mobile phones with electronic money and paying the electronic money for articles have been in widespread use.

In the payment for the articles, it is sufficient for users to hold their credit cards or mobile phones over terminals (readers-writers) installed in shops, so that the users can promptly pay for the articles.

Such an electronic money system has, for example, a structure shown in FIG. 1.

In the electronic money system, a server apparatus 1 and a secure application module (SAM) 2 are provided at the server side and a client apparatus 3 and a reader-writer (R/W) 4 are provided at the client side. The server apparatus 1 is connected to the client apparatus 3 over a network 5.

In the example in FIG. 1, a mobile phone 6 including a contactless IC chip 13 is in proximity to the R/W 4 at the client side. The mobile phone 6 is coupled to the client apparatus 3 over a near-field communication using electromagnetic induction.

A server application 11 installed in the server apparatus 1 communicates with a client application 12 installed in the client apparatus 3 to supply a command (a command executed by the contactless IC chip 13) created in response to a request from the client application 12 to the SAM 2. When the encrypted command is supplied from the SAM 2 to the server application 11, the server application 11 transmits the encrypted command to the client application 12 in the client apparatus 3 over the network 5.

The SAM 2, which is a tamper resistant module, performs cryptographic processing and manages keys used in the cryptographic processing. The SAM 2 encrypts the command supplied from the server application 11 and supplies the encrypted command to the server application 11. The SAM 2 and the contactless IC chip 13 have a common key. Transmitting and receiving information encrypted with the common key realizes cryptographic communication between the SAM 2 and the contactless IC chip 13.

The client application 12 in the client apparatus 3 transmits a predetermined request to the server application 11 in the server apparatus 1. When the command is transmitted from the server application 11 to the client application 12, the client application 12 transmits the command to the contactless IC chip 13 through the R/W 4 to cause the contactless IC chip 13 to execute the command.

The contactless IC chip 13 decrypts the encrypted command transmitted from the SAM 2 through the R/W 4 and so on and executes the decrypted command. When the command instructs update of the electronic money, the command includes information concerning the amount of updated money.

For example, when a user of the mobile phone 6 pays the electronic money stored in the contactless IC chip 13 for an article which the user has bought in the electronic money system having the above structure, the client application 12 in the client apparatus 3 transmits a request to pay for the article to the server application 11 in the server apparatus 1 and the server application 11 receives the request to create a command (Read command) requesting the contactless IC chip 13 to read out the balance of the electronic money.

The Read command created by the server application 11 is encrypted in the SAM 2 and, then, is transmitted to the contactless IC chip 13 through the server application 11 in the server apparatus 1, the network 5, the client application 12 in the client apparatus 3, and the R/W 4. The transmitted Read command is decrypted and executed in the contactless IC chip 13. The balance read out by executing the Read command is encrypted in the contactless IC chip 13 and, then, is transmitted to the SAM 2 through the R/W 4, the client application 12 in the client apparatus 3, the network 5, and the server application 11 in the server apparatus 1 as a response to the server application 11. The encrypted balance transmitted from the contactless IC chip 13 is decrypted in the SAM 2 and the decrypted balance is supplied to the server application 11.

The server application 11 confirms the current balance of the electronic money stored in the contactless IC chip 13 in the manner described above.

After the confirmation, the server application 11 in the server apparatus 1 creates a command (Write command) requesting the contactless IC chip 13 to update the balance of the electronic money (to update to a balance subtracted by the price of the article).

The Write command created by the server application 11 is encrypted in the SAM 2 and, then, is transmitted to the contactless IC chip 13 through the server application 11 in the server apparatus 1, the network 5, the client application 12 in the client apparatus 3, and the R/W 4, as in the Read command previously transmitted. The transmitted Write command is decrypted and executed in the contactless IC chip 13. The Write command includes information indicating the subtracted balance. The balance of the electronic money stored in the contactless IC chip 13 is subtracted by the price of the article in the manner described above.

For example, after the contactless IC chip 13 transmits a message indicating that the subtraction of the balance terminates to the server application 11, a series of processing terminates. The payment for the article is realized in such a series of processing.

The server-client system having the structure described above realizes, for example, management of points issued by shops and payment for a ticket when the client apparatus 3 is mounted as an automatic ticket checker at a station, in addition to the payment for the article. Also in the management of the points and the payment for the ticket, the same processing as in the payment for the article described above is basically performed by the components in the system shown in FIG. 1.

A server-client system having the structure as shown in FIG. 1 is disclosed in Japanese Unexamined Patent Application Publication No. 2003-141063. A technology of using a digital signature to control access to an internal resource, such as a key, is disclosed in the Japanese Unexamined Patent Application Publication No. 2003-524252.

SUMMARY OF THE INVENTION

However, when the SAM 2 is a tamper resistant module and keys and a list of keys are stored in a secure environment, there is a problem in that it may be impossible for an apparatus in an environment different from that of the SAM 2 to flexibly perform operations for the SAM 2 whereas it is possible for an apparatus (for example, the server apparatus 1 in which the server application 11 is installed) in the same environment as that of the SAM 2, which apparatus is connected to the SAM 2 over no external network, to flexibly perform the operations for the SAM 2. The operations for the SAM 2 include encryption of command and decryption of data transmitted from a contactless IC chip.

For example, it may be impossible for an apparatus, in which a server application connected to the SAM 2 over the network 5 in FIG. 1, such as the Internet, is installed, to perform the operations for the SAM 2.

This is because the functions of the SAM 2, such as the encryption of the command to be supplied to the contactless IC chip and the decryption of the response supplied from the contactless IC chip, are fraudulently used and a malicious act, for example, fraudulent update of the balance of the electronic money stored in the contactless IC chip, is possibly carried out when an apparatus having the server application is a malicious apparatus (a user operating the apparatus is a malicious). Consequently, the apparatuses other than apparatuses in the same environment as the SAM 2 are set so as not to perform the operations for the SAM 2.

It is desirable to perform a variety of cryptographic processing even in response to a request from a server in a different environment while ensuring the security.

According to an embodiment of the present invention, an information processing apparatus configured to perform cryptographic processing in response to a request from a server transmitting encrypted information to control an integrated circuit chip includes managing means for managing types of the cryptographic processing granted in accordance with requests; and output means for performing predetermined cryptographic processing requested from a predetermined server succeeding in authentication, when the requested predetermined cryptographic processing has a granted type managed by the managing means, to supply information concerning the processing result to the predetermined server as information to be transmitted to the integrated circuit chip to be controlled.

According to another embodiment of the present invention, an information processing method of performing cryptographic processing in response to a request from a server transmitting encrypted information to control an integrated circuit chip includes the steps of managing types of the cryptographic processing granted in accordance with requests; and performing predetermined cryptographic processing requested from a predetermined server succeeding in authentication, when the requested predetermined cryptographic processing has a granted type managed in the managing step, to supply information concerning the processing result to the predetermined server as information to be transmitted to the integrated circuit chip to be controlled.

According to yet another embodiment of the present invention, a program causing a computer to perform cryptographic processing in response to a request from a server transmitting encrypted information to control an integrated circuit chip includes the steps of managing types of the cryptographic processing granted in accordance with requests; and performing predetermined cryptographic processing requested from a predetermined server succeeding in authentication, when the requested predetermined cryptographic processing has a granted type managed in the managing step, to supply information concerning the processing result to the predetermined server as information to be transmitted to the integrated circuit chip to be controlled.

In the information processing apparatus, the information processing method, and the program of the present invention, types of the cryptographic processing granted in accordance with requests are managed and, when predetermined cryptographic processing requested from a predetermined server succeeding in authentication has a granted and managed type, the requested predetermined cryptographic processing is performed to supply information concerning the processing result to the predetermined server as information to be transmitted to the integrated circuit chip to be controlled.

According to the present invention, it is possible to perform a variety of cryptographic processing even in response to a request from a server in a different environment while ensuring the security.

BRIEF DESCRIPTION OF THE DRAWINGS

FIG. 12 shows an example of description in an access control list;

FIGS. 13A and 13B show a flowchart illustrating the operation of the client-side apparatus and the server-side apparatus;

FIGS. 14A and 14B show a flowchart illustrating the operation of the client-side apparatus and the server-side apparatus, the flowchart following the flowchart in FIGS. 13A and 13B;

DESCRIPTION OF THE PREFERRED EMBODIMENTS

Before describing an embodiment of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 4:
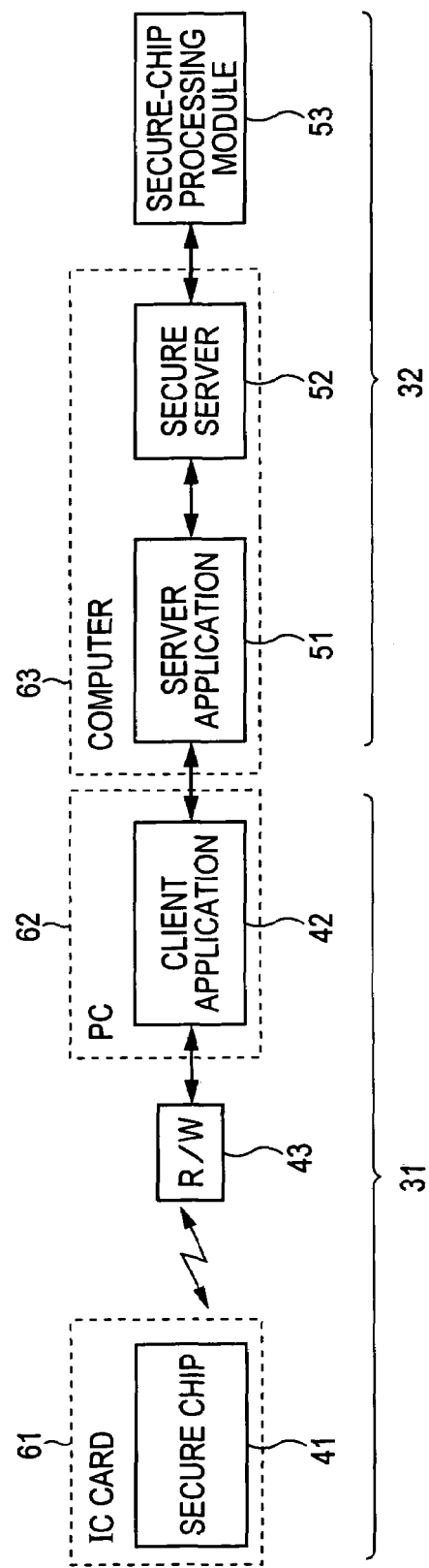
FIG. 4 is a block diagram showing an example of the specific hardware structure of the client-side apparatus and the server-side apparatus.

An information processing apparatus (for example, an apparatus housing a secure-chip processing module 53 in FIG. 4) according to an embodiment of the present invention is configured to perform cryptographic processing in response to a request from a server (for example, a server application 51 in FIG. 4) transmitting encrypted information to control an integrated circuit chip (for example, a secure chip 41 in FIG. 4). The information processing apparatus includes a managing unit (for example, an access controller 202 in FIG. 15 executing Step S224 in FIG. 16) managing types of the cryptographic processing granted in accordance with requests; and an output unit (for example, a cryptographic processor 203 in FIG. 15 executing Step S233 in FIG. 16) performing predetermined cryptographic processing requested from a predetermined server succeeding in authentication, when the requested predetermined cryptographic processing has a granted type managed by the managing unit, to supply information concerning the processing result to the predetermined server as information to be transmitted to the integrated circuit chip to be controlled.

An information processing method according to another embodiment of the present invention performs cryptographic processing in response to a request from a server (for example, the server application 51 in FIG. 4) transmitting encrypted information to control an integrated circuit chip (for example, the secure chip 41 in FIG. 4). The information processing method includes the steps of managing types of the cryptographic processing granted in accordance with requests (Step S224 in FIG. 16); and performing predetermined cryptographic processing requested from a predetermined server succeeding in authentication, when the requested predetermined cryptographic processing has a granted type managed in the managing step, to supply information concerning the processing result to the predetermined server as information to be transmitted to the integrated circuit chip to be controlled (for example, Step S233 in FIG. 16).

A program according to yet another embodiment of the present invention includes the steps similar to those in the information processing method described above.

Embodiments of the present invention will be described with reference to the attached drawings.

Figure 2:
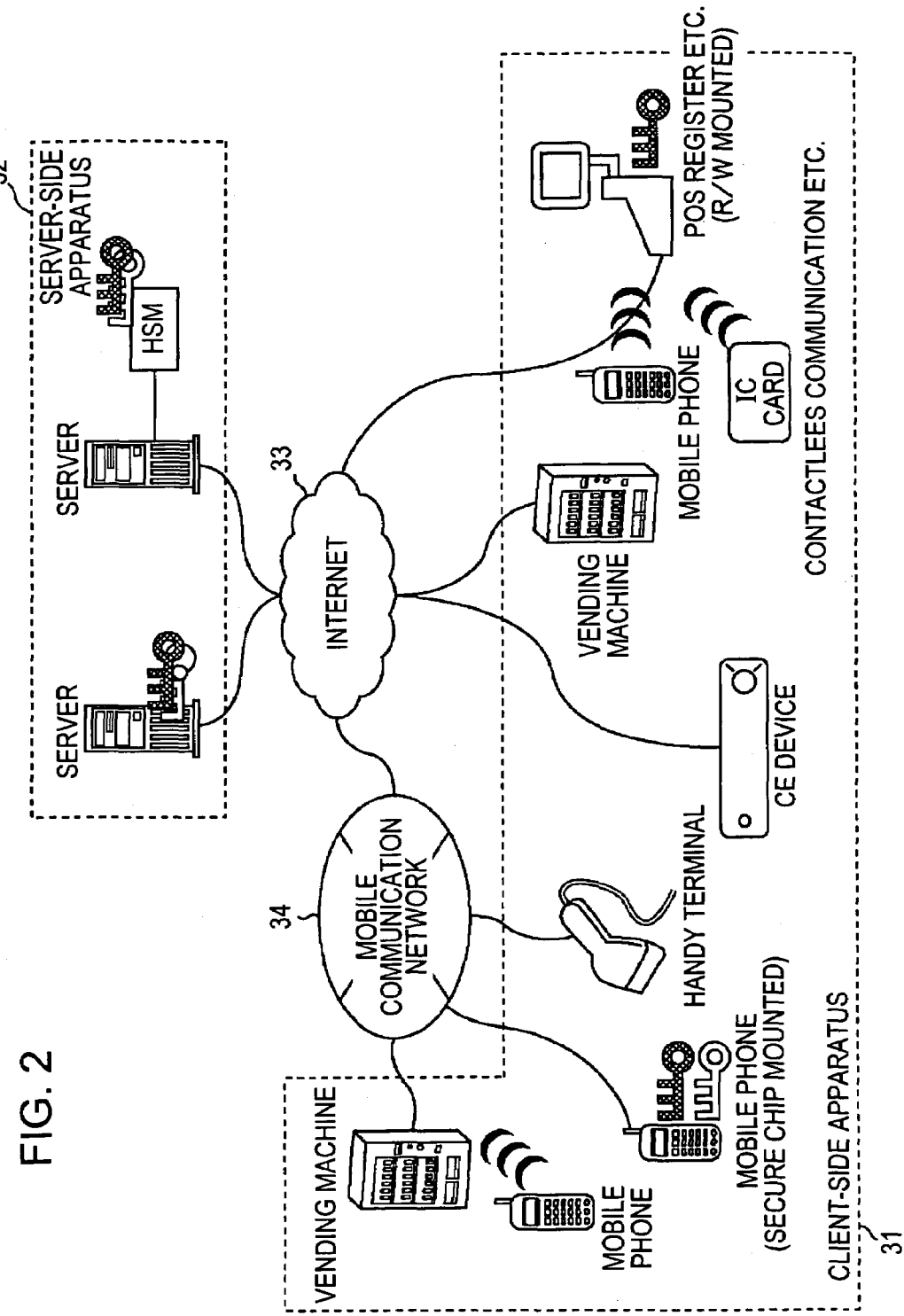
FIG. 2 shows an example of the structure of a server-client system to which the present invention is applied.

FIG. 2 shows an example of the structure of a server-client system (a system means a logical collection of a plurality of apparatuses and the apparatuses are not necessarily included in the same casing) to which the present invention is applied.

The server-client system in FIG. 2 is structured such that various client-side apparatuses 31, which are so-called clients, are connected to server-side apparatuses 32, which are so-called servers, via a network 33, such as the Internet, and a network 34, such as a mobile communication network, if required.

Each of the client-side apparatuses 31 includes a secure chip. The secure chip is a tamper-resistant secure IC chip and is capable of performing contact or contactless data communication with other apparatuses.

The client-side apparatuses 31 include a mobile terminal, such as a mobile phone or a personal digital assistant (PDA), a personal computer (PC), a point of sales (POS) register (a register for a POS system), a vending machine, and a handy terminal. The secure chip included in each of the client-side apparatuses 31 is, for example, FeliCa® adopted in Suica® or the like serving as an electronic commuter ticket.

The server-side apparatuses 32 transmit and receive data to and from the client-side apparatuses 31 over the network 33 and the network 34, if required, to provide various services. For example, when electronic money is stored in the secure chip in the client-side apparatus 31, the corresponding server-side apparatus 32 provides an electronic money service by controlling subtraction of the price of an article from the electronic money in the client-side apparatus 31 and update of the balance of the electronic money in the client-side apparatus 31 to a subtracted balance.

The client-side apparatus 31 encrypts data to be transmitted to the server-side apparatus 32 and transmits the encrypted data to the server-side apparatus 32. The server-side apparatus 32 encrypts data to be transmitted to the client-side apparatus 31 and transmits the encrypted data to the client-side apparatus 31.

Cryptographic processing, such as the encryption and decryption of encrypted data, in the client-side apparatus 31 is performed in the tamper-resistant secure chip. In contrast, the cryptographic processing in the server-side apparatus 32 is performed in a hardware security module (HSM), which is dedicated tamper resistant hardware, or is performed in software implementing the server-side apparatus 32 without using the tamper resistant HSM.

The cryptographic processing is divided into cryptographic processing requiring higher confidentiality and other cryptographic processing. When the server-side apparatus 32 has the HSM, only the cryptographic processing requiring higher confidentiality is performed in the HSM and the other cryptographic processing is performed in the software implementing the server-side apparatus 32.

Figure 3:
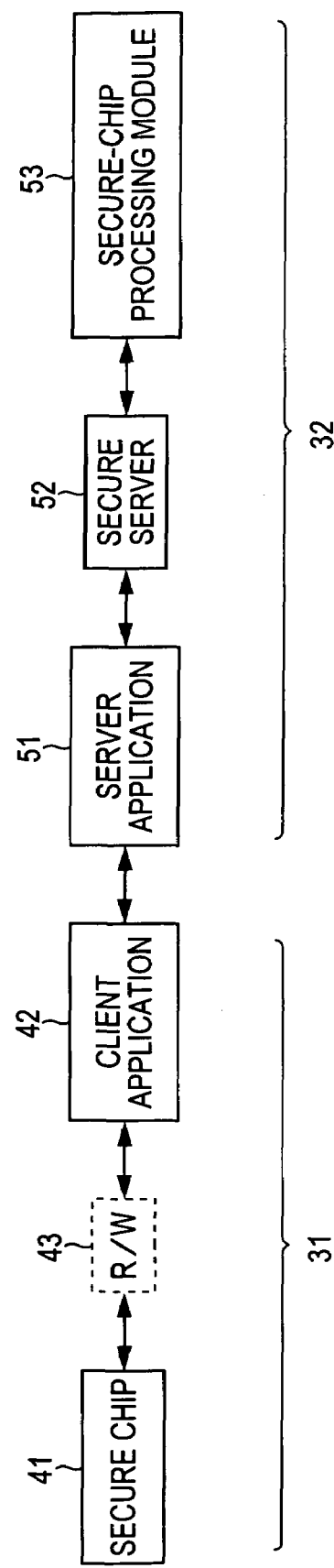
FIG. 3 is a block diagram showing an example of the functional structure of a client-side apparatus and a server-side apparatus in FIG. 2.

FIG. 3 is a block diagram showing an example of the functional structure of the client-side apparatus 31 and the server-side apparatus 32.

The client-side apparatus 31 includes a secure chip 41, a client application 42, and a reader-writer (R/W) 43, if necessary.

The secure chip 41 is a tamper-resistant secure IC chip and is capable of performing contact or contactless data communication with other apparatuses.

Specifically, the secure chip 41 communicates with the client application 42 directly or via the R/W 43 to perform processing, for example, in accordance with a command transmitted from the client application 42 through the communication. After the processing, the secure chip 41 transmits response data in response to the command to the client application 42 directly or via the R/W 43. The secure chip 41 also performs the cryptographic processing for the transmitted and received data in order to ensure the security.

The client application 42 is, for example, software executed by a computer, which is hardware. The client application 42 functions as a client of a server application 51 described below in the server-side apparatus 32.

The client application 42 transmits and receives data (including commands) to and from the server application 51 and supplies the commands to the secure chip 41 directly or via the R/W 43 to write and read the data in and from the secure chip 41, in order to realize various services.

For example, when the client application 42 and the server application 51 are software providing the electronic money service and a storage area for the electronic money service is allocated in the secure chip 41, the data (including commands) required for the electronic money service is communicated between the client application 42 and the server application 51. The data communication includes the subtraction of the price of an article from the electronic money stored in the secure chip 41 and the update of the balance of the electronic money stored in the secure chip 41 to a subtracted balance.

The client application 42 includes a module for controlling the communication with the server application 51, if required.

The R/W 43 performs the contactless or contact communication with the secure chip 41 to transmit the commands supplied from the client application 42 to the secure chip 41. In addition, the R/W 43 receives the data transmitted from the secure chip 41 and supplies the received data to the client application 42.

The server application 51 is, for example, software executed by a computer, which is hardware. The server application 51 functions as a server of the client application 42 in the client-side apparatus 31. The server application 51 transmits and receives data (including commands) to and from the client application 42 to realize various services including the electronic money service described above.

The server application 51 requests a secure server 52 to perform the cryptographic processing for the data that is transmitted and received in order to ensure the security.

The server application 51 includes a module for controlling the communication with the client application 42, if required.

The secure server 52 is, for example, software executed by a computer, which is hardware. The secure server 52 performs the cryptographic processing or requests a secure-chip processing module 53 to perform the cryptographic processing, in response to the request for the cryptographic processing from the server application 51.

Specifically, the secure server 52 requests the secure-chip processing module 53 to perform cryptographic processing requiring higher confidentiality, among the cryptographic processing requested by the server application 51, and performs other cryptographic processing by itself.

The secure-chip processing module 53 performs the cryptographic processing (the cryptographic processing requiring higher confidentiality) in response to the request from the secure server 52.

Figure 1:
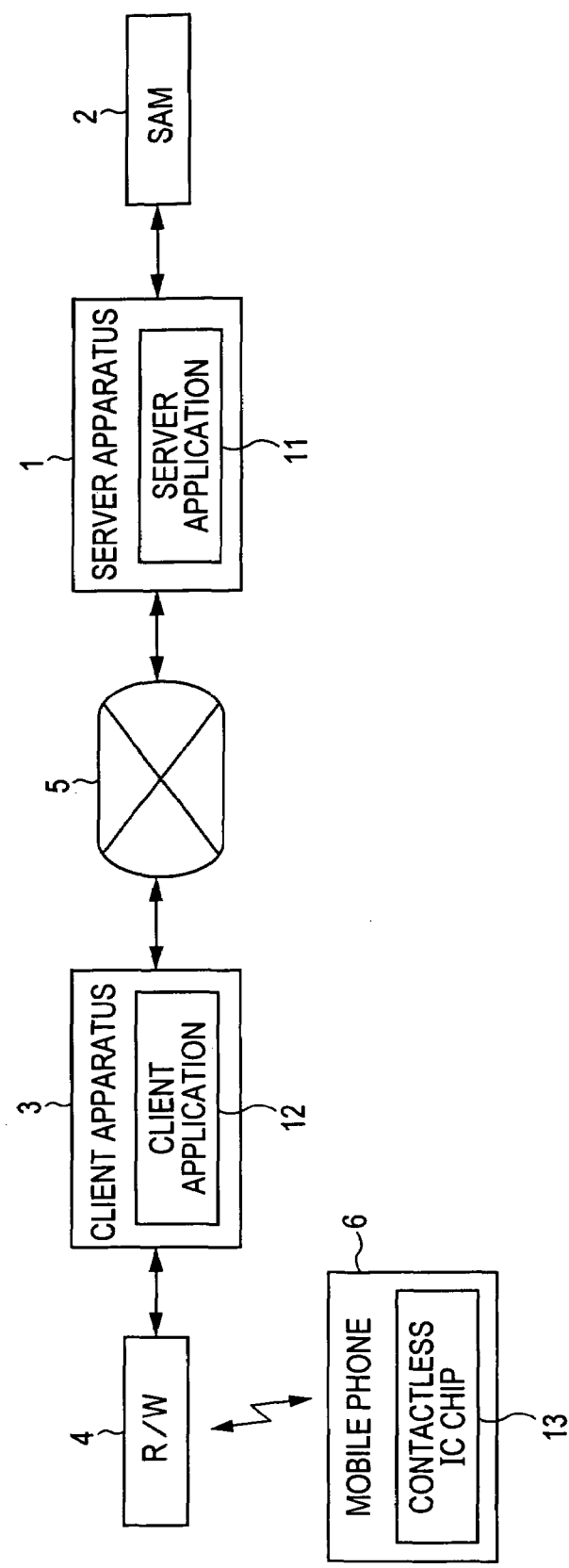
FIG. 1 is a block diagram showing an example of the structure of an electronic money system in related art.

It is assumed herein that the secure-chip processing module 53 is housed in, for example, dedicated tamper resistant hardware. However, the secure-chip processing module 53 may be one module (software) in the secure server 52. The hardware housing the secure-chip processing module 53 corresponds to the SAM 2 in FIG. 1.

As described below, the secure-chip processing module 53 performing the cryptographic processing described above manages a list used for controlling external access (including the server application 51) to, for example, a key managed by the secure-chip processing module 53. The secure-chip processing module 53 performs the cryptographic processing, such as the encryption of a command, only in response to a request from a person to whom access is granted in the list.

FIG. 4 is a block diagram showing an example of the specific hardware structure of the client-side apparatus 31 and the server-side apparatus 32.

Referring to FIG. 4, the client-side apparatus 31 includes the R/W 43, an integrated circuit (IC) card 61, and a personal computer (PC) 62.

The IC card 61 includes the secure chip 41, which is hardware. For example, the IC card 61 corresponds to a card, such as Edy®, storing the electronic money.

The PC 62 is owned by, for example, a user of the IC card 61. The client application 42 is installed in the PC 62. The user operates the PC 62 to inquire the balance of the electronic money stored in the IC card 61 (the secure chip 41) or to charge the electronic money.

Referring to FIG. 4, the server-side apparatus 32 includes the secure-chip processing module 53 and a computer 63.

The computer 63 is, for example, a server (machine) which is hardware. The server application 51 and the secure server 52 are installed in the computer 63.

Figure 5:
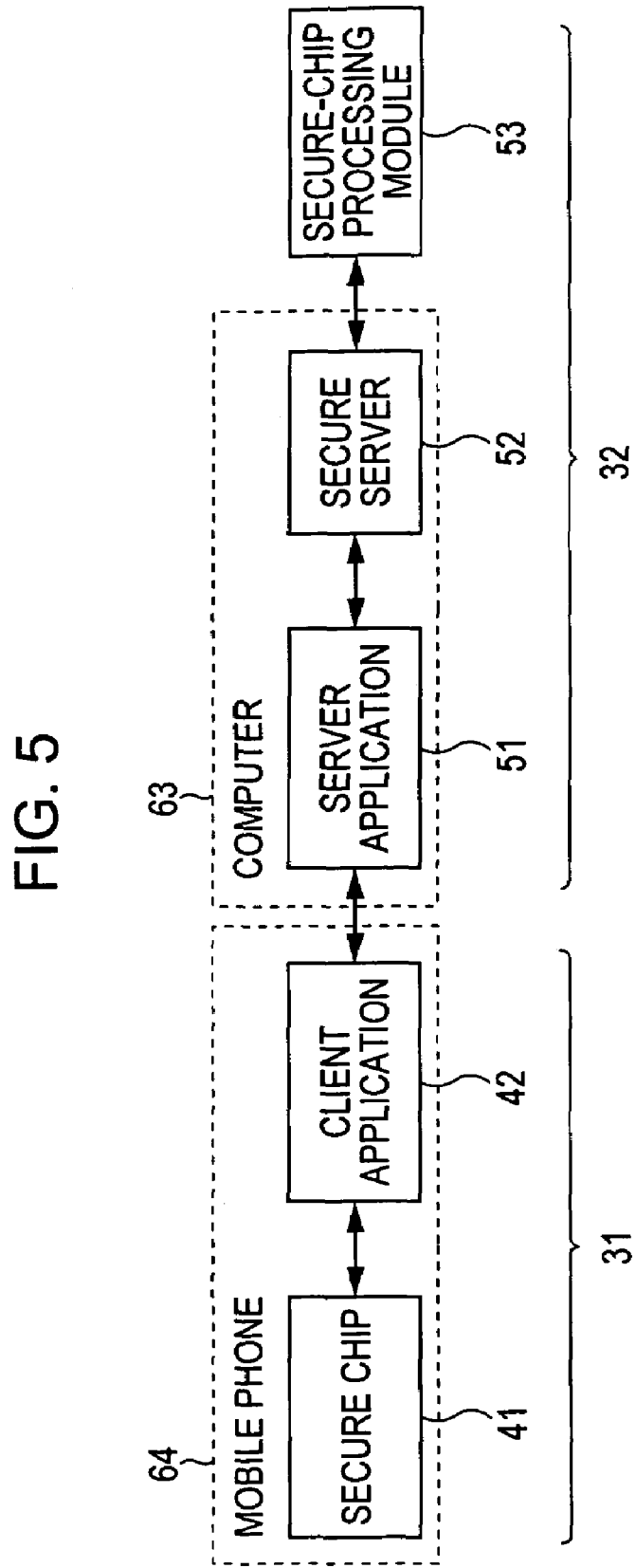
FIG. 5 is a block diagram showing another example of the specific hardware structure of the client-side apparatus 31 and the server-side apparatus.

FIG. 5 is a block diagram showing another example of the specific hardware structure of the client-side apparatus 31 and the server-side apparatus 32. The hardware structure of the server-side apparatus 32 in FIG. 5 is similar to that in FIG. 4.

Referring to FIG. 5, the client-side apparatus 31 is a mobile phone 64.

The mobile phone 64 includes the secure chip 41, which is hardware. The client application 42 is installed in the mobile phone 64. The user operates the mobile phone 64 to inquire the balance of the electronic money stored in the secure chip 41 or to charge the electronic money.

Access to the secure chip 41 included in the mobile phone 64 may be achieved by using a communication function of the mobile phone 64 or may be achieved by bringing the mobile phone 64 (the secure chip 41 included in the mobile phone 64) close to the R/W 43 (not shown in FIG. 5).

Figure 6:
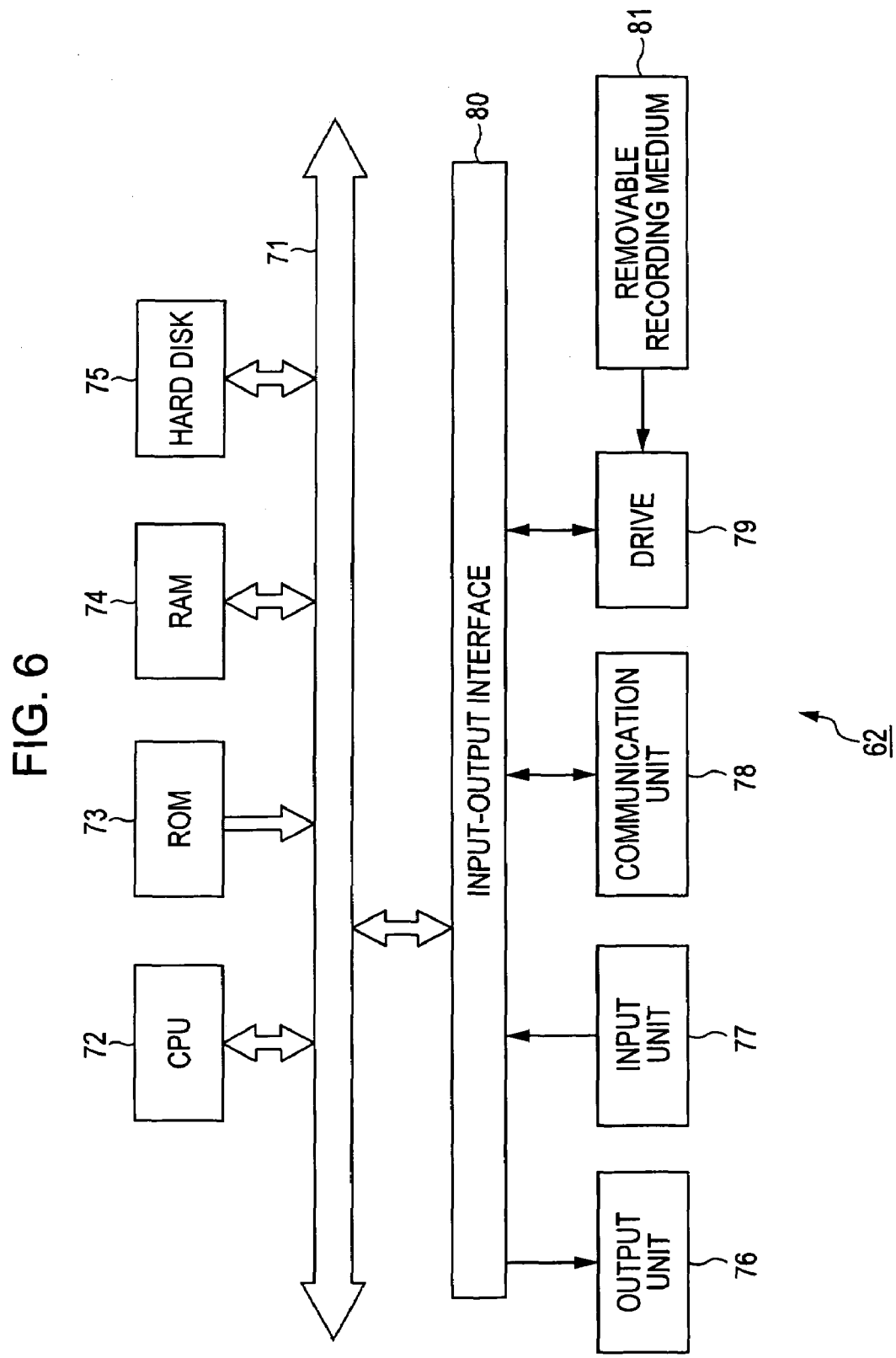
FIG. 6 is a block diagram showing an example of the hardware structure of a PC in FIG. 4.

FIG. 6 is a block diagram showing an example of the hardware structure of the PC 62 in FIG. 4, in which the client application 42 is installed.

The PC 62 includes a central processing unit (CPU) 72. An input-output interface 80 is connected to the CPU 72 via a bus 71. The CPU 72 executes programs stored in a read only memory (ROM) 73 in response to instructions that are input by the user with an input unit 77 including a keyboard, a mouse, a microphone, etc. and that are supplied through the input-output interface 80.

The CPU 72 loads programs stored in a hard disk 75, programs that are transferred over a satellite or a network, are received by a communication unit 78, and are installed in the hard disk 75, or programs that are read out from a removable recording medium 81 loaded in a drive 79 and are installed in the hard disk 75, in a random access memory (RAM) 74, and executes the loaded programs.

The CPU 72 performs a variety of processing in the above manner. The CPU 72 outputs a processing result from an output unit 76 including a liquid crystal display (LCD), speaker, etc., transmits the processing result from the communication unit 78, and/or stores the processing result in the hard disk 75, as needed, through the input-output interface 80.

The input-output interface 80 has, for example, a universal serial bus (USB) terminal and the R/W 43 in FIG. 4 is capable of being connected to the USB terminal.

Figure 7:
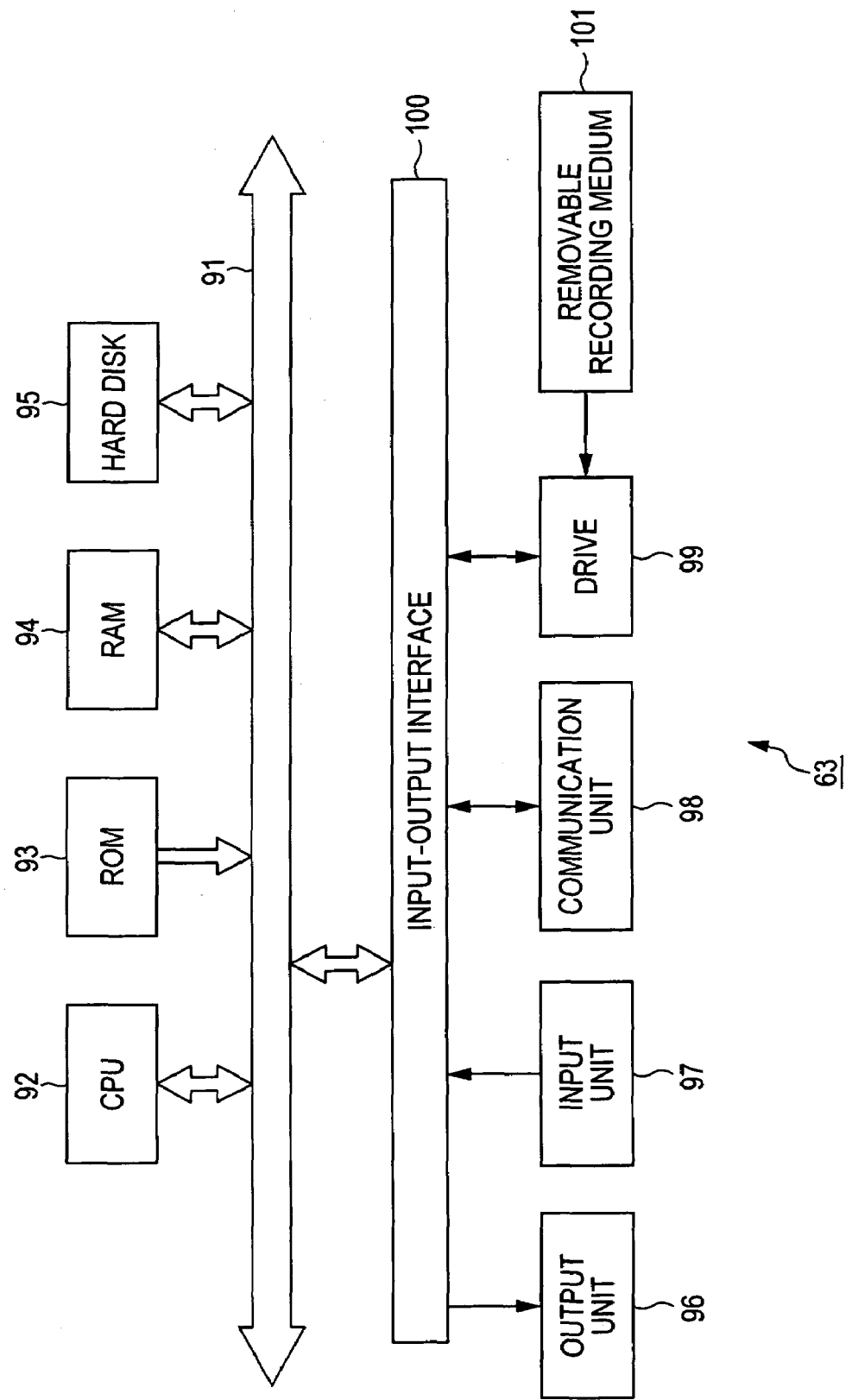
FIG. 7 is a block diagram showing an example of the hardware structure of a computer in FIG. 4.

FIG. 7 is a block diagram showing an example of the hardware structure of the computer 63 in FIG. 4, in which the server application 51 and the secure server 52 are installed.

Referring to FIG. 7, components from a bus 91 to a removable recording medium 101 in the computer 63 are structured in the same manner as the components from the bus 71 to the removable recording medium 81 in FIG. 6. A description of such components in FIG. 7 is omitted herein.

Figure 8:
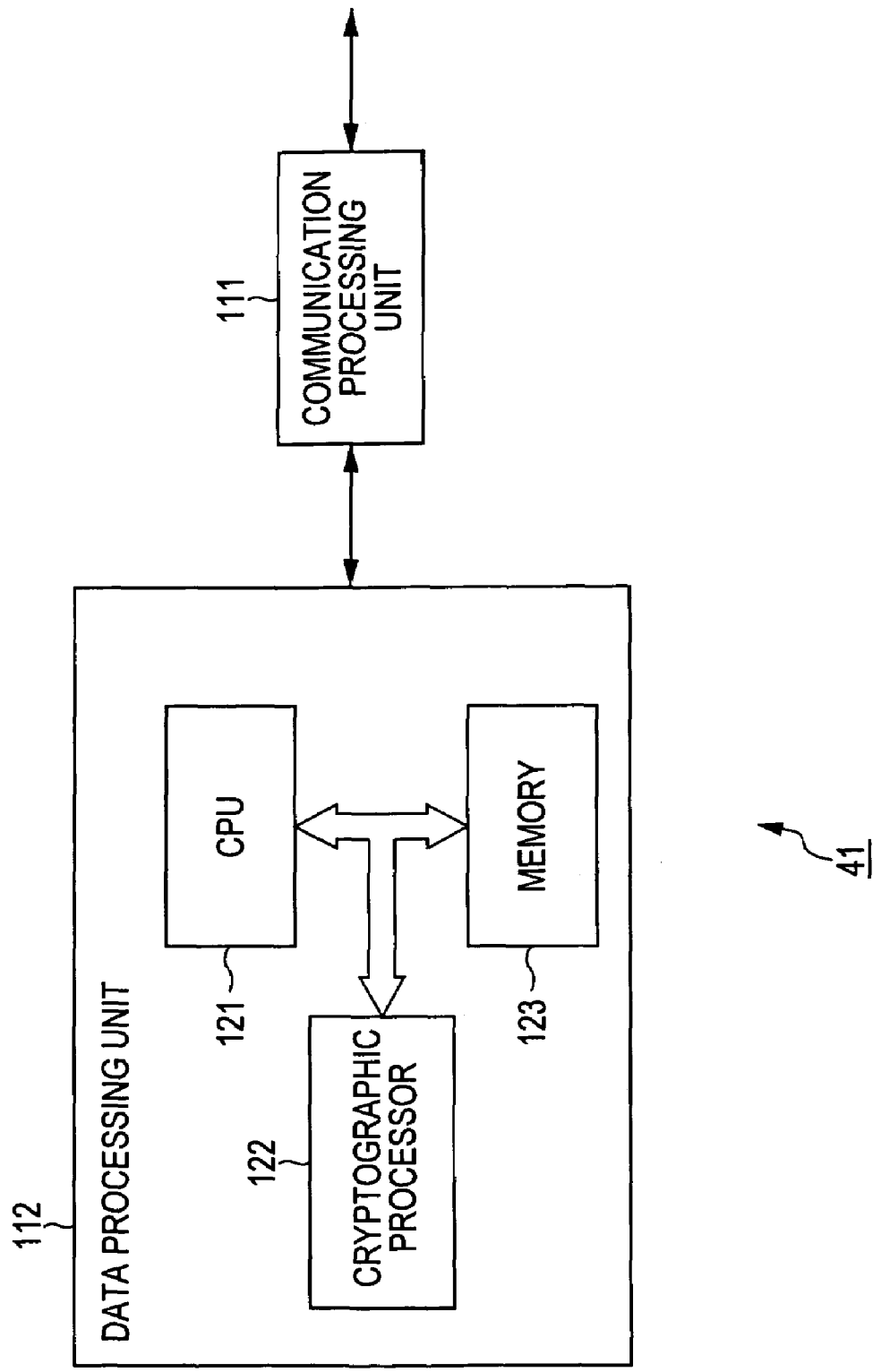
FIG. 8 is a block diagram showing an example of the hardware structure of a secure chip in FIG. 3.

FIG. 8 is a block diagram showing an example of the hardware structure of the secure chip 41 in FIG. 3.

The secure chip 41 mainly includes a communication processing unit 111 and a data processing unit 112. The communication processing unit 111 performs processing required for contact or contactless communication with devices external to the secure chip 41 to supply data (including commands) externally transmitted to the data processing unit 112 and to transmit data supplied from the data processing unit 112 to the external devices. The processing required for the external communication, performed by the secure chip 41, includes encoding and decoding of data etc. and modulation and demodulation thereof.

The data processing unit 112 includes, for example, a CPU 121, a cryptographic processor 122, and a memory 123. The data processing unit 112 performs a variety of processing in accordance with commands supplied from the communication processing unit 111.

Specifically, the CPU 121 controls the cryptographic processor 122 and manages the memory 123. The CPU 121 writes and reads data in and from the memory 123 in accordance with the commands supplied from the communication processing unit 111 and performs data processing for data stored in the memory 123. The CPU 121 executes programs stored in the memory 123 to perform a variety of processing.

The cryptographic processor 122 performs authentication including generation of a random number used in challenge-and-response authentication and generation of a key (information concerning cryptographic key) used in encryption and decryption, in addition to the cryptographic processing including the encryption and decryption of data (including commands), under the control of the CPU 121. In other words, the cryptographic processor 122 performs a variety of processing by using the encrypted data.

The memory 123, which is a non-volatile memory, stores data and programs. Physically, the memory 123 may be one memory or may include a plurality of memories. When the memory 123 includes a plurality of memories, nonvolatile memories may be used as part of the memories.

Figure 9:
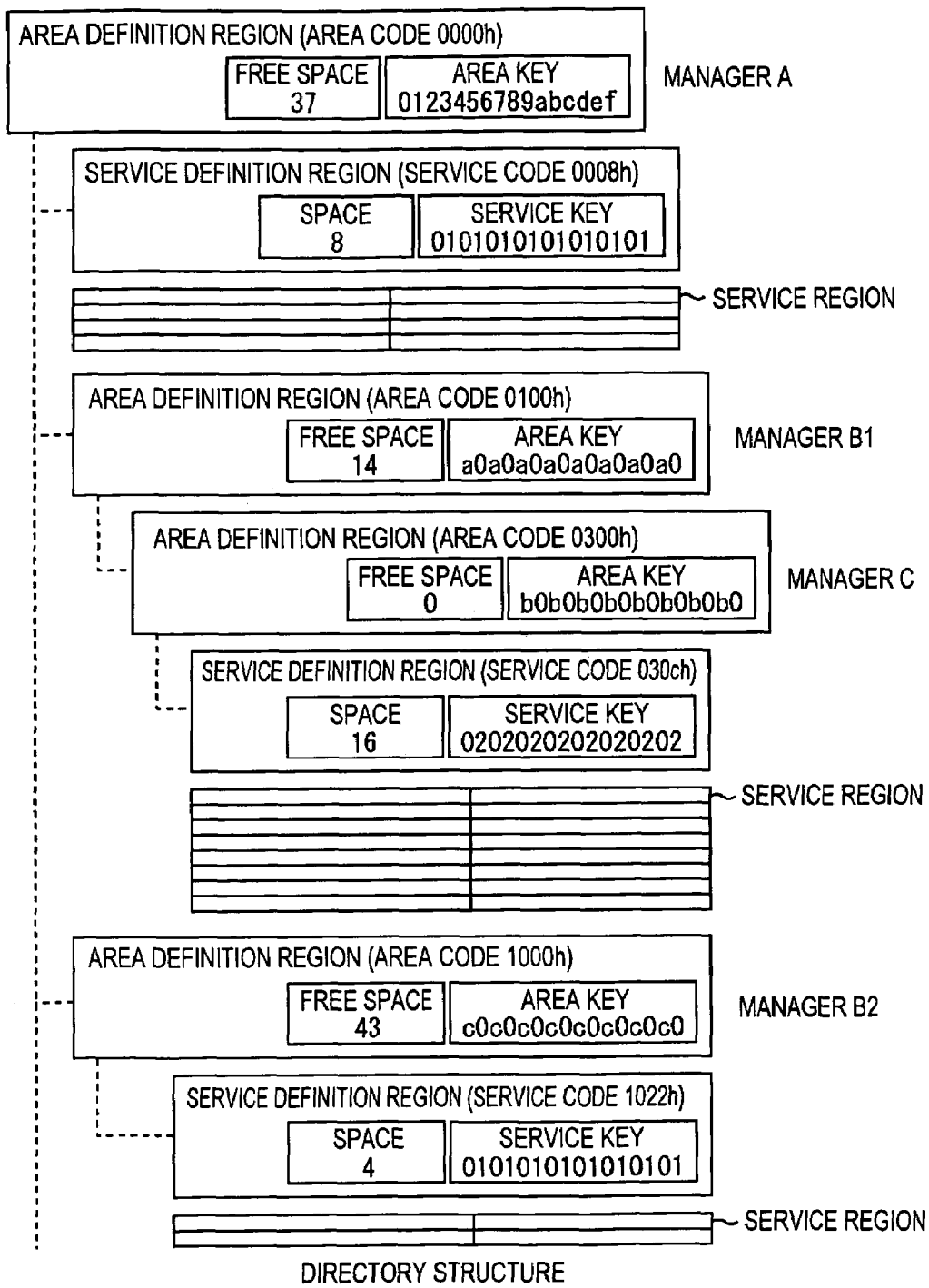
FIG. 9 shows an example of the directory structure of the secure chip.

The CPU 121 layers the storage area of the memory 123, as shown in FIG. 9, to manage the layered storage area.

FIG. 9 shows an example of the directory structure of the memory 123.

Part of the storage area of the memory 123 is used as a data storage area storing data used for providing various services. The data storage area has a layered structure in which area definition regions corresponding to directories are layered. Each area definition region is capable of including area definition regions and service definition regions.

The area definition regions are parts of the data storage area of the memory 123 and are allocated to managers managing service providers who provide services (the managers may be service providers). An area code as an identification code that is used as a name for identifying the area definition region, a free space indicating the number of available free blocks, and an area key as a key required for getting access to the area definition region (including the area definition region(s) and the service definition region(s) under the area definition region) are allocated in each of the area definition region.

In the embodiment shown in FIG. 9, the area definition region allocated to a manger A corresponds to the top layer and the area definition regions of managers B1 and B2 are created under the area definition region allocated to the manager A. The area definition region of a manager C is created under the area definition region of the manger B1.

The service definition regions are parts of the data storage area of the memory 123, used for managing service regions described below and are allocated to services provided by the service providers. A service code as an identification code that is used as a name for identifying the service definition region, the number of blocks indicating the capacity of a service region in which data required for providing the service is stored, and a service key as a key required for getting access to the service definition region (including the service region managed by the service definition region) are allocated in each of the service definition region.

The service regions are parts of the data storage area and each include zero or more blocks in which data required for providing the service is stored. The number of blocks constituting the service region is described as the capacity of the service definition region managing the service region.

The CPU 121 manages the data storage area of the memory 123 in units of fixed blocks in the storage capacity. The capacities of the free spaces and the service regions in FIG. 9 are managed based on the number of blocks.

The service provider creates the service definition region under the area definition region managed by one manager and uses the service region managed in the service definition region to provide various services. For example, in the provision of the electronic money service, the balance of the electronic money and the information concerning an article for which the electronic money is paid (for example, the name and/or price of the article) are stored in the service region.

Figure 10:
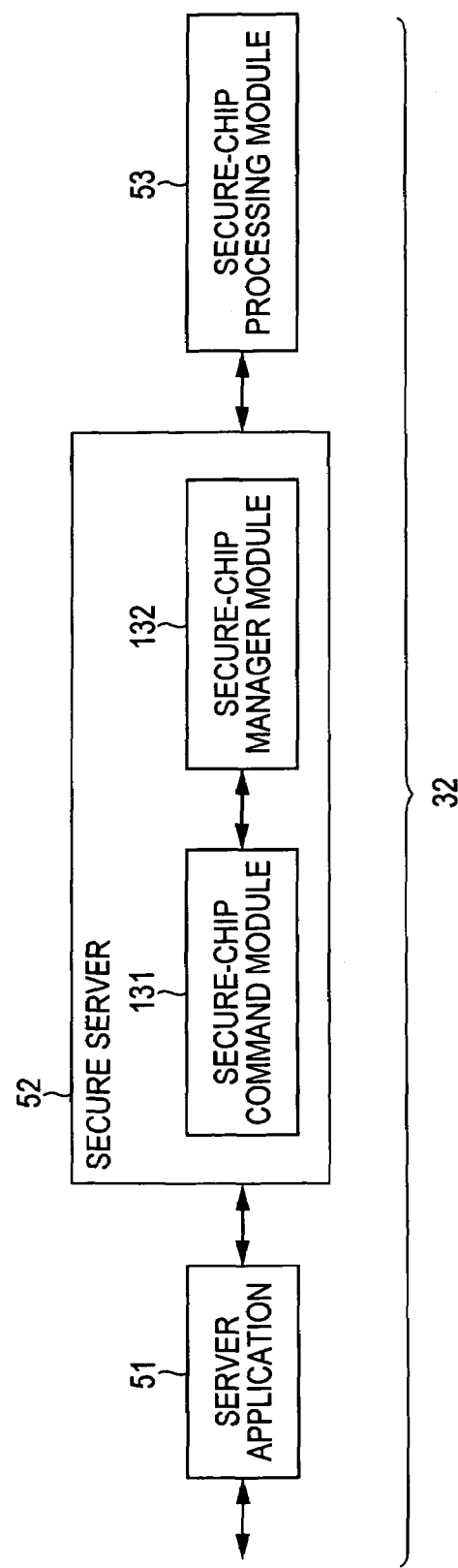
FIG. 10 is a block diagram showing an example of a detailed structure of a secure server in FIG. 3.

FIG. 10 is a block diagram showing an example of a detailed structure of the secure server 52 in FIG. 3.

The secure server 52 includes a secure-chip command module 131 and a secure-chip manager module 132.

The secure-chip command module 131 creates a command for the secure chip 41 to be controlled, for example, in response to a request to create the command from the server application 51 and supplies the created command to the server application 51. In other words, when the server application 51 instructs the secure chip 41 in the client-side apparatus 31 to perform some kind of processing, the server application 51 requests the secure-chip command module 131 to create the command corresponding to the processing.

The secure-chip command module 131 creates the command for the secure chip 41 in response to the request from the server application 51 and supplies the created command to the server application 51.

Accordingly, even when the secure chips (the secure chips differ in the operation codes functioning as the commands, in the parameters of the commands, and in the kinds of the commands) in various command systems exist, it is not necessary to create the server application 51 for every secure chip in the various command systems because the server application 51 needs not to know the command for the secure chip 41 to be controlled (the server application 51 may know the command).

In other words, it is sufficient for the server application 51 to use the command system which the secure-chip command module 131 is capable of translating.

The secure-chip command module 131 creates the command for the secure chip 41 in response to the request from the server application 51 and supplies the created command to the server application 51. However, before supplying the created command to the server application 51, the secure-chip command module 131 supplies the command to the secure-chip manager module 132 to request encryption of the command. The secure-chip command module 131 supplies cryptographic information (for example, the encrypted command) supplied from the secure-chip manager module 132 in response to the request to the server application 51.

The secure-chip manager module 132 supplies the cryptographic information resulting from the cryptographic processing in the secure-chip manager module 132 or in the secure-chip processing module 53 to the secure-chip command module 131.

Management of external access to the secure-chip processing module 53 in FIG. 10 will now be described. The access to the secure-chip processing module 53 means requesting the secure-chip processing module 53 to perform the cryptographic processing including the encryption and decryption using the key managed by the secure-chip processing module 53 to cause the secure-chip processing module 53 to perform the cryptographic processing.

Accordingly, permission of access to a predetermined key means that the secure-chip processing module 53 is allowed to perform processing using the predetermined key. Permission of access to predetermined cryptographic processing mans that the secure-chip processing module 53 is allowed to perform the predetermined cryptographic processing among a variety of processing including authentication (two-way/one way), encryption of the entire or part of a command, creation of a command execution right described below.

Figure 11:
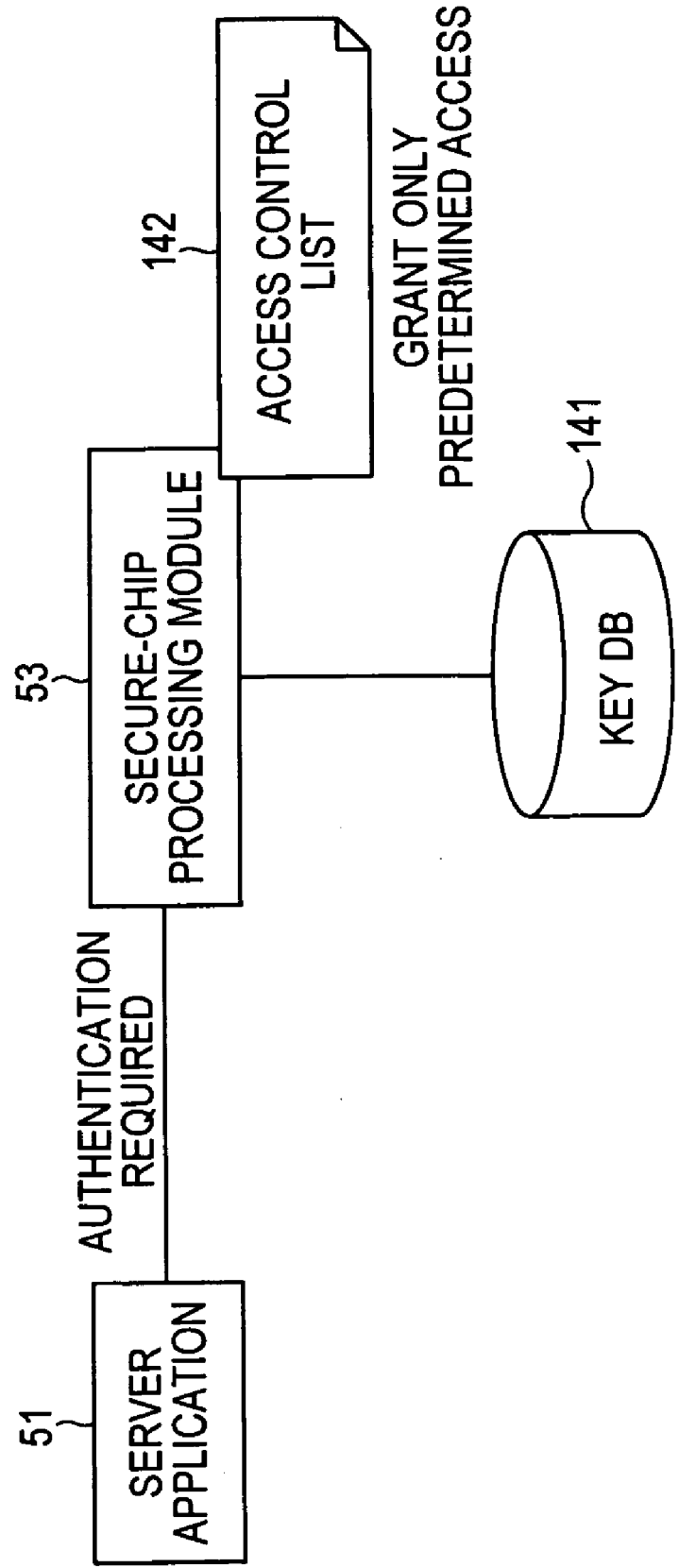
FIG. 11 is a conceptual diagram of access management by a secure-chip processing module.

FIG. 11 is a conceptual diagram of access management by the secure-chip processing module 53.

As shown in FIG. 11, the secure-chip processing module 53 manages a key database (DB) 141 in which keys are stored. The key DB 141 is built in the secure-chip processing module 53 or in an external storage device. The keys, for example, which are encrypted with a predetermined key by the secure-chip processing module 53, are stored in the key DB 141.

The secure-chip processing module 53 manages an access control list 142 used for controlling access from external devices including the server application 51 and the secure server 52.

Access is granted only to software whose validity is verified by the authentication with the secure-chip processing module 53 and which is registered in the access control list 142 as external software to which access is granted. Accordingly, in order to cause the secure-chip processing module 53 to perform the above cryptographic processing, it is necessary for the server application 51 to be verified by the authentication with the secure-chip processing module 53.

The server application 51 may be directly connected to the secure-chip processing module 53 via no secure server 52 (FIG. 3), as shown in FIG. 11.

FIG. 12 shows an example of description in the access control list 142.

"Access Control List", "Format Information", "Key Access Information", "Authentication Information for Application", and "Authentication Information for Operator Access" are described in the access control list 142.

The "Access Control List" shows basic information concerning the access control list 142. A valid period (expiration date) and limitation of the number of accesses (once, unlimited, etc.) are described in the "Access Control List".

The "Format Information" shows information concerning the format (the regions structure including a system, areas, and services) of the secure chip 41 at which the access control list 142 is targeted and the keys set in the respective regions. A format name (format identification (ID)) and format information (an area code, a service code, a key ID, a key version number, etc.) are described in the "Format Information".

The "Key Access Information" indicates an access right common to an application (external software, such as the server application 51) and an operator (the operator may be a person (manager) or may be software for the operator).

The application or the operator is granted access to the key having the ID and the cryptographic processing to which the access right is granted in the "Key Access Information". The ID of a key to which access is to be granted and the content of the access to be granted (output of the Read command, output of the Write command, change of the key, creation of the command execution right described below) are described in the "Key Access Information".

The "Authentication Information for Application" shows information concerning the authentication with an application (the server application 51). Authentication information, list information, information concerning the cryptographic processing, and information concerning the valid period are described in the "Authentication Information for Application" in association with the ID of the application.

The authentication information, among the information described in association with the ID of the application, includes information concerning the keys used in the authentication with the application, encryption and decryption algorithms used in the authentication by using encrypted data, and a certificate of a public key when the authentication is performed by using the public key. The list information includes information concerning the list of the area codes and the service codes used for the authentication between the secure chip 41 and the server-side apparatus 32.

The information concerning the cryptographic processing represents the kind of the cryptographic processing to which access from the application is granted. For example, a predetermined kind of cryptographic processing, among the cryptographic processing including the two-way/one-way authentication, the creation of the command execution right, and the encryption of a command, is permitted to the application. The information indicating the valid period (expiration date) of the access is also associated with the ID of the application.

For example, when the authentication between the server application 51 and the secure-chip processing module 53 is to be performed, the authentication is performed with the secure-chip processing module 53 by a method defined in the authentication information associated with the ID of the server application 51. If the authentication succeeds, access to the cryptographic processing of the kind to which access from the application is granted in the information concerning the cryptographic processing is permitted.

Information indicating whether output of a session key generated for encryption of a communication path is granted is also described in the "Authentication Information for Application". As described below, when the output of the session key is granted in the "Authentication Information for Application", the session key generated by the secure-chip processing module 53 is supplied from the secure-chip processing module 53 to the secure-chip manager module 132 (FIG. 10).

The "Authentication Information for Operator Access" shows information concerning the authentication with an operator. Information used in the authentication with the operator (information concerning the keys, encryption and decryption algorithms used in the authentication by using encrypted data, and the certificate of the public key when the authentication is performed by using the public key), information indicating the content of the access granted to the operator (registration, deletion, addition and reference of the key), and information indicating the valid period (expiration data) are described in the "Authentication Information for Operator Access" in association with the ID of the operator.

The secure-chip processing module 53 refers to the access control list 142 having the variety of information described therein to control external access to the secure-chip processing module 53. Accordingly, since only the software to which the access is granted is capable of causing the secure-chip processing module 53 to perform the cryptographic processing, the cryptographic processing is not performed in response to a request from the software in an apparatus to which the access is not granted and which is used by a malicious person. Hence, it is possible to prevent the secure-chip processing module 53 from being maliciously and externally used.

Conversely, even software in an environment different from that of the secure-chip processing module 53 (an apparatus in an environment other than the same environment as that of the tamper resistant apparatus including the secure-chip processing module 53) is capable of causing the secure-chip processing module 53 to perform the cryptographic processing as long as the access is granted to the software (apparatus).

The operation of the client-side apparatus 31 and the server-side apparatus 32 will be described with reference to FIGS. 13A and 13B and FIGS. 14A and 14B.

Figure 14B:
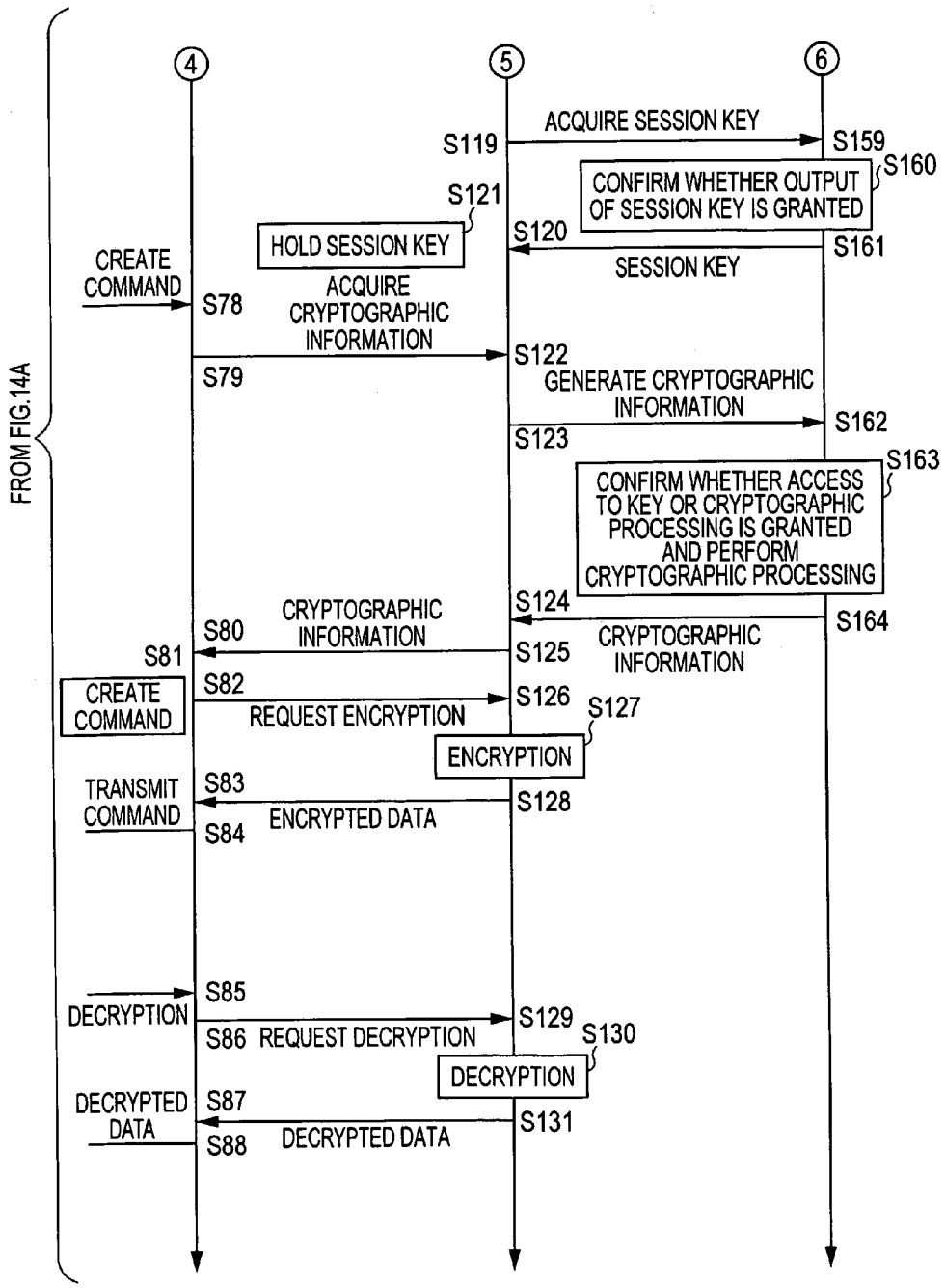

FIGS. 13A and 13B show a flowchart mainly illustrating an authentication process (the authentication between the server application 51 and the secure-chip processing module 53 and between the secure chip 41 and the secure-chip processing module 53). FIGS. 14A and 14B show a flowchart mainly illustrating a process of creating a command after the authentication process in FIGS. 13A and 13B. Steps in FIGS. 13A and 13B are hereinafter referred to as steps in FIG. 13 and steps in FIGS. 14A and 14B are hereinafter referred to as steps in FIG. 14 for simplicity.

After the client application 42 is invoked, in Step S21, the client application 42 transmits a command to request secure chip information concerning the secure chip to the secure chip 41.

In Step S11, the secure chip 41 receives the command transmitted from the client application 42. In Step S12, the secure chip 41 transmits the secure chip information as a response to the command to the client application 42.

In Step S22, the client application 42 receives the secure chip information transmitted from the secure chip 41. In Step S23, the client application 42 transmits a server connection request, along with initial information including the secure chip information, to the server-side apparatus 32.

The initial information includes client information concerning the client application 42 and server application specification specifying the server application 51 in the server-side apparatus 32 to which the client application 42 is to be connected, in addition to the secure chip information.

The secure chip information includes a secure chip type indicating the type of the secure chip 41, a secure chip OS type indicating the operating system (OS) adopted in the secure chip 41, and a secure-chip file structure which is information (a file format, a list of the area codes, and a list of the service codes (memory format)) concerning the data management in the secure chip 41. With the secure chip information, the server-side apparatus 32 identifies the type of the secure chip 41 to be controlled.

The client information includes a client type indicating the hardware of the client-side apparatus 31 (for example, information indicating that the client-side apparatus 31 is a mobile phone, a PC, or a POS register), a client OS type indicating the OS adopted in the client-side apparatus 31, a client application ID identifying the client application 42, and an application version indicating the version number of the client application 42.

The client application 42 may acquire the secure chip information from the secure chip 41 in response to the request for the initial information including the secure chip information from the server application 51, which request is submitted, for example, after the connection to the server application 51, and may include the acquired secure chip information in the initial information to transmit the initial information to the server application 51.

However, acquiring the secure chip information from the secure chip 41 and, then, transmitting the initial information including the secure chip information to the server application 51 along with the server connection request by the client application 42, shown in FIG. 13, require less communication between the client application 42 and the server application 51.

In addition, since the server-side apparatus 32 receives the client information simultaneously with the start of the access from the client-side apparatus 31, the server-side apparatus 32 is capable of transmitting and receiving commands and messages (for example, a graphical user interface (GUI) such as a screen) appropriate for the client application 42 based on the client information. The commands and messages appropriate for the client application 42 mean commands or messages whose content is appropriate for the client application 42 or commands and messages the length or the number of which is appropriate for the client application 42.

In Step S41, the server application 51 receives the server connection request and the initial information from the client application 42, invokes an application (software) used for providing a service required by the client-side apparatus 31, and proceeds to Step S42.

In Step S42, the server application 51 supplies the secure chip information and the client information, included in the initial information received in Step S41, to the secure-chip manager module 132 in the secure server 52.

In Step S111, the secure-chip manager module 132 receives the secure chip information and the client information supplied from the server application 51 and supplies the secure chip information to the secure-chip processing module 53.

In Step S151, the secure-chip processing module 53 receives the secure chip information supplied from the secure-chip manager module 132. In Step S152, the secure-chip processing module 53 receives specification of the format of the secure chip 41 to be controlled based on the received secure chip information. As described below, if the authentication with the server application 51 succeeds, the server application 51 (the secure-chip manager module 132, which has received the request from the server application 51 through the secure-chip command module 131) is granted access to the specified format (keys corresponding to the keys set in the respective regions of the format).

Specifically, the secure-chip processing module 53 is capable of performing the cryptographic processing for various secure chips and services and includes keys required for the cryptographic processing for the various secure chips and services (also includes keys corresponding to the keys set in the respective regions in the memory 123 in the secure chip 41).

When the secure chip 41 receives, for example, provision of only the electronic money service, the secure-chip processing module 53 performs (permits) only the cryptographic processing required for providing the electronic money service for the secure chip 41. When a key used in the encryption and decryption of data in the electronic money service is set in advance, the secure-chip processing module 53 permits the secure chip 41 to use only the key used in the encryption and decryption of the data in the electronic money service and does not permit the secure chip 41 to use keys used in the encryption and decryption of data in other services.

In contrast, the secure-chip manager module 132 is ready to perform the processing appropriate for the secure chip 41 and the client application 42 to be controlled based on the secure chip information and the client information received from the server application 51 in Step S111.

In Step S112, the secure-chip manager module 132 supplies an initialization instruction to the secure-chip command module 131.

In Step S71, the secure-chip command module 131 receives the initialization instruction and initializes itself so as to be capable of performing processing appropriate for the secure chip 41.

Then, the two-way authentication is performed between the server application 51 (Step 43) and the secure-chip processing module 53 (Step S153). If the two-way authentication succeeds (the validity of the server application 51 is verified), then in Step S154, the secure-chip processing module 53 grants the server application 51 access to a predetermined key and access to predetermined cryptographic processing in accordance with the content of the access control list.

When the two-way authentication between the server application 51 and the secure-chip processing module 53 terminates, the authentication between the secure chip 41 and the secure-chip processing module 53 is to be performed.

The authentication between the secure chip 41 and the secure-chip processing module 53 is performed by, for example, the challenge-and-response method. In Step S44, the server application 51 submits a command creation request requesting the start of the authentication to the secure-chip command module 131.

In Step S72, the secure-chip command module 131 receives the command creation request from the server application 51. In Step S73, the secure-chip command module 131 creates a command for the secure chip 41 in response to the command creation request from the server application 51 and supplies a request for encryption of the command to generate cryptographic information to the secure-chip manager module 132.

In Step S113, the secure-chip manager module 132 receives the request for encryption of the command to generate cryptographic information from the secure-chip command module 131. In Step S114, the secure-chip manager module 132 supplies the request to the secure-chip processing module 53.

In Step S155, the secure-chip processing module 53 receives the request from the secure-chip manager module 132. In Step S156, the secure-chip processing module 53 refers to the access control list to confirm whether the server application 51 is granted access to the key for generating the cryptographic information and whether the server application 51 is granted access to the cryptographic processing for generating the cryptographic information (for example, the encryption of a predetermined algorithm).

The request from the secure-chip manager module 132 includes the ID of the server application 51 and so on. In this step, the secure-chip processing module 53 refers to information concerning the cryptographic processing to which access is granted and which is associated with the ID of the server application 51 to perform the confirmation.

If the secure-chip processing module 53 determines that the server application 51 is granted access to both the key and the cryptographic processing for generating the cryptographic information in Step S156, the secure-chip processing module 53 encrypts, for example, the random number that is generated to generate the cryptographic information. In Step S157, the secure-chip processing module 53 supplies the cryptographic information to the secure-chip manager module 132.

In Step S115, the secure-chip manager module 132 receives the cryptographic information supplied from the secure-chip processing module 53. In Step S116, the secure-chip manager module 132 supplies the cryptographic information received from the secure-chip processing module 53 to the secure-chip command module 131.

In Step S74, the secure-chip command module 131 receives the cryptographic information supplied from the secure-chip manager module 132. In Step S75, the secure-chip command module 131 supplies the cryptographic information (the encrypted command) to the server application 51.

In Step S45, the server application 51 receives the cryptographic information supplied from the secure-chip command module 131. In Step S46, the server application 51 transmits the cryptographic information (the encrypted command) to the client application 42 along with device data, which is a message to the hardware, or the client-side apparatus 31.

In Step S24, the client application 42 receives the cryptographic information and the device data transmitted from the server application 51. In Step S25, the client application 42 transmits the cryptographic information to the secure chip 41.

In Step S13, the secure chip 41 receives the cryptographic information transmitted from the client application 42 and decrypts the cryptographic information into the command with a session key. The secure chip 41 performs processing corresponding to the command. In Step S14, the secure chip 41 transmits response data in response to the command to the client application 42. The response data is encrypted with a key owned by the secure chip 41 in the secure chip 41, if needed.

In Step S26, the client application 42 receives the response data transmitted from the secure chip 41. In Step S27, the client application 42 transmits the response data to the server application 51.

In Step S47, the server application 51 receives the response data transmitted from the client application 42. In Step S48, the server application 51 transmits the response data to the secure-chip command module 131 to request response processing.

In Step S76, the secure-chip command module 131 receives the request for the response processing from the server application 51. In Step S77, the secure-chip command module 131 supplies the cryptographic information (the information encrypted by the secure chip 41) included in the response data to the secure-chip manager module 132 in response to the request for the response processing from the server application 51.

In Step S117, the secure-chip manager module 132 receives the cryptographic information supplied from the secure-chip command module 131. In Step S118, the secure-chip manager module 132 supplies the cryptographic information to the secure-chip processing module 53.

In Step S158, the secure-chip processing module 53 receives the cryptographic information supplied from the secure-chip manager module 132 and decrypts the cryptographic information. If the secure-chip processing module 53 determines that a decryption result is correct, it is determined that the authentication between the secure chip 41 and the secure-chip processing module 53 succeeds. The transmission of the command from the server-side apparatus 32, which corresponds to a challenge, and the transmission of the response data from the client-side apparatus 31, which corresponds to a response, are repeated a predetermined number of times.

If the authentication between the secure chip 41 and the secure-chip processing module 53 succeeds, for example, the random number generated for generating the cryptographic information in Step S156 is used in the secure-chip processing module 53 (and in the secure chip 41) as the session key for identifying the session between the secure chip 41 and the secure-chip processing module 53.

Then, in the server-side apparatus 32, the command to be transmitted to the secure chip 41 (including parameters and other data accompanying the command) is encrypted by using the generated session key as the key and the encrypted command is transmitted to the client-side apparatus 31. Also in the client-side apparatus 31, the data and so on to be transmitted from the secure chip 41 to the server-side apparatus 32 are encrypted in the secure chip 41 by using the session key as the key and the encrypted data is transmitted to the server-side apparatus 32.

The encryption of the data and so on by using the session key as the key and the transmission of the encrypted data in the above manner both in the client-side apparatus 31 and the server-side apparatus 32 cause the communication path between the client-side apparatus 31 and the server-side apparatus 32 to be encrypted, that is, cause a virtual private network (VPN) to be realized.

After the session key is generated, in Step S119 in FIG. 14, the secure-chip manager module 132 supplies a request for the session key to the secure-chip processing module 53.

In Step S159, the secure-chip processing module 53 receives the request for the session key from the secure-chip manager module 132. In Step S160, the secure-chip processing module 53 refers to the access control list to confirm whether the content of the access granted to the server application 51 includes output of the session key to the secure-chip manager module 132.

If the secure-chip processing module 53 determines that the secure-chip manager module 132 is granted the output of the session key, then in Step S161, the secure-chip processing module 53 supplies the session key, which is generated in response to the request from the secure-chip manager module 132 after the authentication with the secure chip 41, to the secure-chip manager module 132.

In Step S120, the secure-chip manager module 132 receives the session key supplied from the secure-chip processing module 53. In Step S121, the secure-chip manager module 132 holds the session key.

Then, for example, the encryption with session key is performed in the secure-chip manager module 132 and only the encryption requiring higher confidentiality is performed in the secure-chip processing module 53.

Performing the encryption with session key in the secure-chip manager module 132 and performing only the encryption requiring higher confidentiality (including the two-way authentication performed by using the encryption and creation of a package described below) in the secure-chip processing module 53 can reduce the load on the secure-chip processing module 53, compared with a case in which all the cryptographic processing is performed in the secure-chip processing module 53. As a result, it is possible to reduce the processing time in the secure-chip processing module 53.

A plurality of tamper-resistant secure-chip processing modules 53 may be provided and the processing may be distributed over the plurality of secure-chip processing modules 53 in order to reduce the load on each of the secure-chip processing modules 53.

In Step S49, the server application 51 supplies a request to create a command to be transmitted to the secure chip 41 to the secure-chip command module 131.

In Step S78, the secure-chip command module 131 receives the request to create the command, supplied from the server application 51.

In Step S79, the secure-chip command module 131 requests the secure-chip manager module 132 to acquire cryptographic information to be included in the command in response to the request to create the command from the server application 51. Specifically, in this example, the request from the server application 51 corresponds to a request to create a special command needing the encryption requiring higher confidentiality. In the example, the secure-chip command module 131 supplies a request to acquire the cryptographic information to be included in the command to the secure-chip manager module 132.

The special command is, for example, a command requesting the secure chip 41 to register the area definition region or the service definition region or a command requesting the secure chip 41 to delete the area definition region or the service definition region.

In Step S122, the secure-chip manager module 132 receives the request from the secure-chip command module 131. In Step S123, the secure-chip manager module 132 supplies a request to generate the cryptographic information (the command execute right) to the secure-chip processing module 53.

In Step S162, the secure-chip processing module 53 receives the request from the secure-chip manager module 132. In Step S163, the secure-chip processing module 53 refers to the access control list to confirm whether the server application 51 is granted access to the key for generating the cryptographic information and whether the server application 51 is granted access to the cryptographic processing for generating the cryptographic information (whether creation of the command execute right is permitted).

If the secure-chip processing module 53 determines that the server application 51 is granted access to both the key and the cryptographic processing for generating the cryptographic information in Step S163, the secure-chip processing module 53 encrypts (data on) a warrant indicating the execution right to execute the special command in response to the request from the secure-chip manager module 132 (the request from the server application 51) to generate the cryptographic information.

In addition, the secure-chip processing module 53 adds (data on) a certificate verifying the validity of the warrant to the encryption result of the warrant, and, in Step S164, creates a package of the certificate and (the encryption result of) the warrant and supplies the package to the secure-chip manager module 132.

In Step S124, the secure-chip manager module 132 receives the package (the cryptographic information) supplied from the secure-chip processing module 53. In Step S125, the secure-chip manager module 132 supplies the received cryptographic information to the secure-chip command module 131.

In Step S80, the secure-chip command module 131 receives the cryptographic information supplied from the secure-chip manager module 132. In Step S81, the secure-chip command module 131 creates a command including the cryptographic information as parameter information. In Step S82, the secure-chip command module 131 requests the secure-chip manager module 132 to encrypt the created command (the encryption with the session key).

If the command which the server application 51 requests to create in Step S49 is not a special command, Steps S79 to S80 in the secure-chip command module 131, Steps S122 to S125 in the secure-chip manager module 132, and Steps S162 to S164 in the secure-chip processing module 53 are omitted. In this case, the secure-chip command module 131 creates a command including predetermined parameter information (parameter information, which is not a package) in response to the request from the server application 51.

In Step S126, the secure-chip manager module 132 receives the request from the secure-chip command module 131. In Step S127, the secure-chip manager module 132 encrypts the command created in the secure-chip command module 131 with the session key held in Step S121.

In Step S128, the secure-chip manager module 132 supplies the encrypted command as encrypted data to the secure-chip command module 131.

In Step S83, the secure-chip command module 131 receives the encrypted data supplied from the secure-chip manager module 132. In Step S84, the secure-chip command module 131 supplies the encrypted data (command) to the server application 51.

In Step S50, the server application 51 receives the command supplied from the secure-chip command module 131. In Step S51, the server application 51 transmits the command to the client application 42 along with the device data, which is a message for the hardware, or the client-side apparatus 31.

In Step S28, the client application 42 receives the cryptographic information and the device data transmitted from the server application 51. In Step S29, the client application 42 transmits the cryptographic information to the secure chip 41.

In Step S15, the secure chip 41 receives the cryptographic information transmitted from the client application 42 and decrypts the cryptographic information into the command. In addition, the secure chip 41 performs processing corresponding to the command after confirming the execution right of the command, if needed. In Step S16, the secure chip 41 transmits response data in response to the command to the client application 42. The response data is encrypted with the session key owned by the secure chip 41.

In Step S30, the client application 42 receives the response data transmitted from the secure chip 41. In Step S31, the client application 42 transmits the response data to the server application 51.

In Step S52, the server application 51 receives the response data transmitted from the client application 42. In Step S53, the server application 51 requests the secure-chip command module 131 to decrypt the response data.

In Step S85, the secure-chip command module 131 receives the request from the server application 51. In Step S86, the secure-chip command module 131 requests the secure-chip manager module 132 to decrypt the response data.

In Step S129, the secure-chip manager module 132 receives the request from the secure-chip command module 131. In Step S130, the secure-chip manager module 132 decrypts the response data with the session key.

In Step S131, the secure-chip manager module 132 supplies the decrypted data to the secure-chip command module 131.

In Step S87, the secure-chip command module 131 receives the decrypted data supplied from the secure-chip manager module 132. In Step S88, the secure-chip command module 131 supplies the decrypted data to the server application 51.

In Step S54, the server application 51 receives the decrypted data supplied from the secure-chip command module 131. In Step S55, the server application 51 performs predetermined response processing to confirm whether, for example, the command transmitted to the secure chip 41 is executed and update of the information is successfully performed in the secure chip 41.

The processes described above are performed between the client-side apparatus 31 and the server-side apparatus 32.

The secure-chip processing module 53 performing the above access control will be described in detail.

Figure 15:
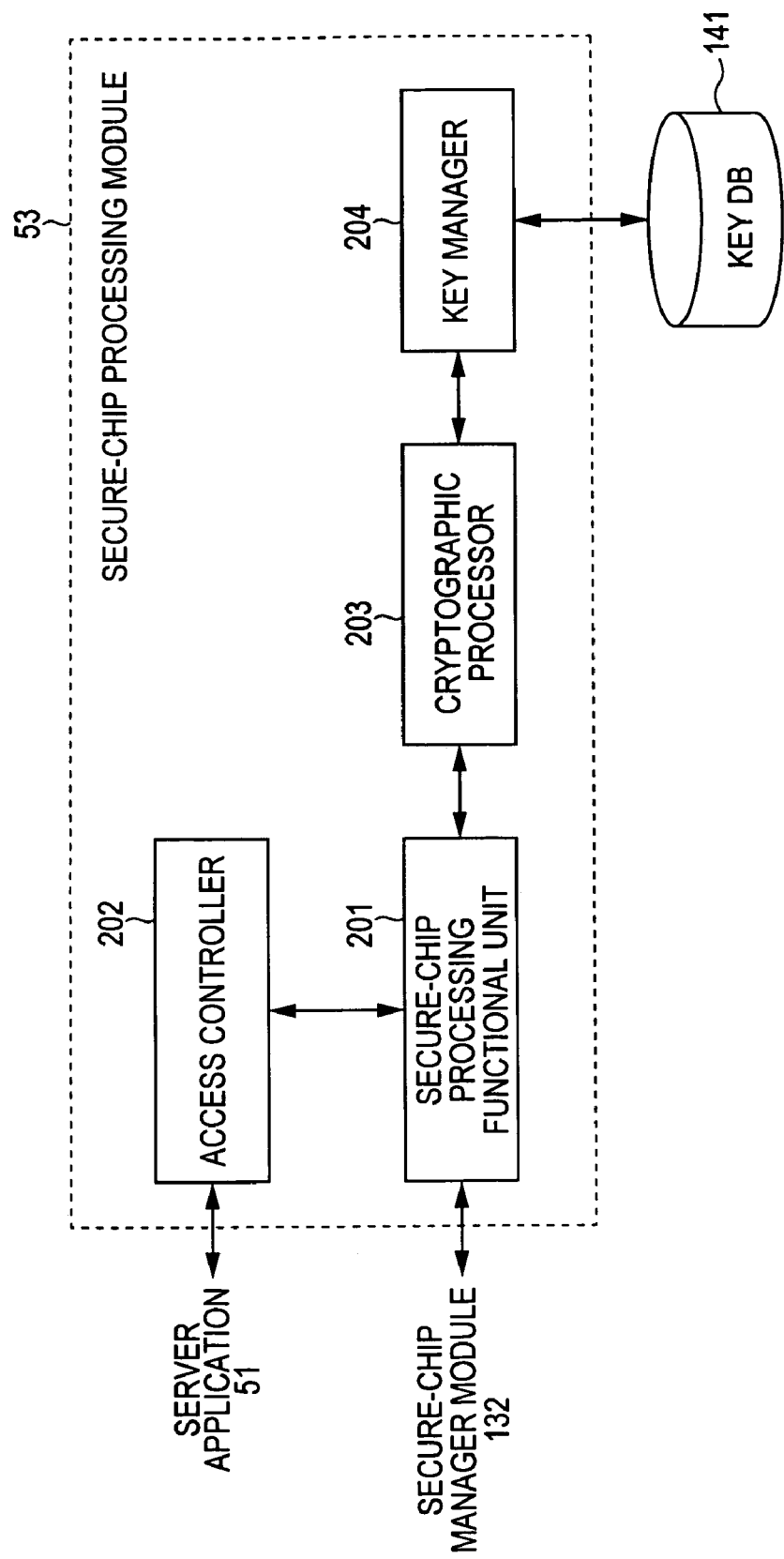
FIG. 15 is a block diagram showing an example of the structure of the secure-chip processing module.

FIG. 15 is a block diagram showing an example of the structure of the secure-chip processing module 53.

The secure-chip processing module 53 includes a secure-chip processing functional unit 201, an access controller 202, a cryptographic processor 203, and a key manager 204. Although the key DB 141 is built outside the secure-chip processing module 53 in FIG. 15, the key DB 141 may be built in the secure-chip processing module 53, as described above.

The secure-chip processing functional unit 201 controls the entire secure-chip processing module 53. The secure-chip processing functional unit 201 manages input and output of information in and from external devices including the secure-chip manager module 132 and responses in response to requests from the external devices.

For example, the secure-chip processing functional unit 201 causes the access controller 202 to confirm whether access to the key and the cryptographic processing, requested from the server application 51 (secure-chip manager module 132), is granted. Only if the access to the key and the cryptographic processing is granted, the secure-chip processing functional unit 201 causes the cryptographic processor 203 to perform the requested cryptographic processing. When a result of the cryptographic processing is supplied from the cryptographic processor 203, the secure-chip processing functional unit 201 supplies the result of the cryptographic processing to the secure-chip manager module 132.

The access controller 202 manages the access control list. The access controller 202 refers to the access control list to confirm whether access to the secure-chip processing functional unit 201, requested from the external devices, is granted in response to the request from the secure-chip processing functional unit 201. As described above, the content of the access granted to the application (server application 51) that has requested the access is described in the access control list. The confirmation result by the access controller 202 is indicated to the secure-chip processing functional unit 201.

The access controller 202 also performs the two-way authentication with the server application 51.

The access controller 202 may be integrated with the secure-chip processing functional unit 201 to form a functional unit. In this case, the functional unit including the secure-chip processing functional unit 201 and the access controller 202 performs the processing in the secure-chip processing functional unit 201 described above and the processing in the access controller 202.

The cryptographic processor 203 acquires a key from the key manager 204, if required, and uses the acquired key to perform requested processing when the secure-chip processing functional unit 201 requests the cryptographic processor 203 to perform an operation using a key (for example, registration, deletion, etc. of the key) or predetermined cryptographic processing using the key (for example, encryption, decryption, etc.). The cryptographic processor 203 returns a result of the operation or the cryptographic processing using the key to the secure-chip processing functional unit 201, if needed.

When the key acquired from the key manager 204 is encrypted, the cryptographic processor 203 decrypts the encrypted key and performs the processing requested from the secure-chip processing functional unit 201 by using the decrypted key.

The key manager 204 stores the encrypted key in the key DB 141 and supplies the encrypted key stored in the key DB 141 in response to a request from the cryptographic processor 203.

When the key DB 141 is built in an external storage device, the key manager 204 may acquire the key requested from the cryptographic processor 203 from the key DB 141 or may acquire the key through predetermined software that is capable of accessing the key DB 141. The key may be held in the secure-chip processing module 53 without being encrypted. In this case, the key manager 204 supplies the key read out from the key DB 141 built in the secure-chip processing module 53 to the cryptographic processor 203 without any processing.

The operation of the components in the secure-chip processing module 53 shown in FIG. 15 will be described with reference to flowcharts.

Figure 16:
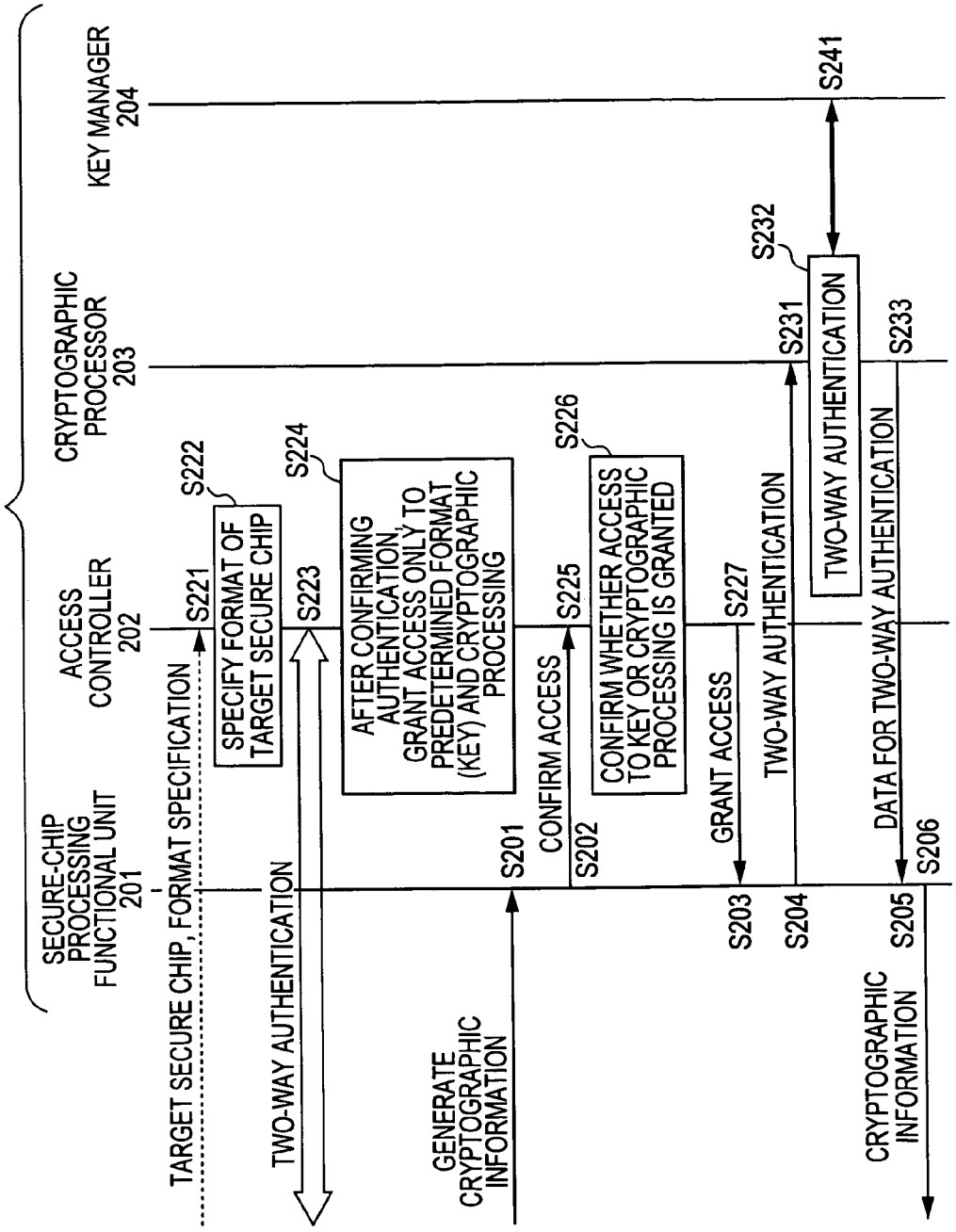
FIG. 16 is a flowchart showing in detail a process in the secure-chip processing module.

First, a two-way authentication process performed by the secure-chip processing module 53 will be described with reference to a flowchart in FIG. 16. FIG. 16 shows in detail the steps from S151 to S157 in FIG. 13 as steps in the components in the secure-chip processing module 53 in FIG. 15.

In Step S221, the access controller 202 in the secure-chip processing module 53 receives the secure chip information supplied from the secure-chip manager module 132. In Step S222, the access controller 202 receives specification of the format of the secure chip to be controlled based on the received secure chip information.

In Step S223, the access controller 202 performs two-way authentication with the server application 51. If the validity of the server application 51 is verified in this two-way authentication, then in Step S224, the access controller 202 grants access to a predetermined key and access to predetermined cryptographic processing from the server application 51 in accordance with the content of the access control list managed by the access controller 202.

The steps from S221 to S224 in the access controller 202 correspond to the steps from S151 to S154 in FIG. 13, respectively.

When a request to generate cryptographic information is supplied from the secure-chip manager module 132, in Step S201, the secure-chip processing functional unit 201 receives the request. This request is a request to generate the cryptographic information used in the authentication between the secure chip 41 and the secure-chip processing module 53 (the request in Step S114 in FIG. 13).

In Step S202, the secure-chip processing functional unit 201 requests the access controller 202 to confirm whether the server application 51 is granted access to the key for generating the cryptographic information and whether the server application 51 is granted access to the cryptographic processing for generating the cryptographic information.

In Step S225, the access controller 202 receives the request from the secure-chip processing functional unit 201. In Step S226, the access controller 202 refers to the access control list to perform the confirmation. If the access controller 202 confirms that access to the key and the cryptographic processing is granted, then in Step S227, the access controller 202 indicates to the secure-chip processing functional unit 201 that access to the key and the cryptographic processing is granted.

In Step S203, the secure-chip processing functional unit 201 receives the indication from the access controller 202. In Step S204, the secure-chip processing functional unit 201 requests the cryptographic processor 203 to perform two-way authentication.

In Step S231, the cryptographic processor 203 receives the request from the secure-chip processing functional unit 201. In Step S232, the cryptographic processor 203 performs the two-way authentication with the key manager 204 (Step S241 in the key manager 204). If the two-way authentication succeeds, the cryptographic processor 203 decrypts the encrypted key used for generating cryptographic information, supplied from the key manager 204, and uses the decrypted key to generate the cryptographic information.

In Step S233, the cryptographic processor 203 supplies the generated cryptographic information as data for the two-way authentication used in the two-way authentication between the secure chip 41 and the secure-chip processing module 53 to the secure-chip processing functional unit 201.

In Step S205, the secure-chip processing functional unit 201 receives the data for the two-way authentication, supplied from the cryptographic processor 203. In Step S206, the secure-chip processing functional unit 201 supplies the data for the two-way authentication to the secure-chip manager module 132.

The steps S201, S226, and S206 correspond to the steps from S155 to S157 in FIG. 13, respectively.

Figure 17:
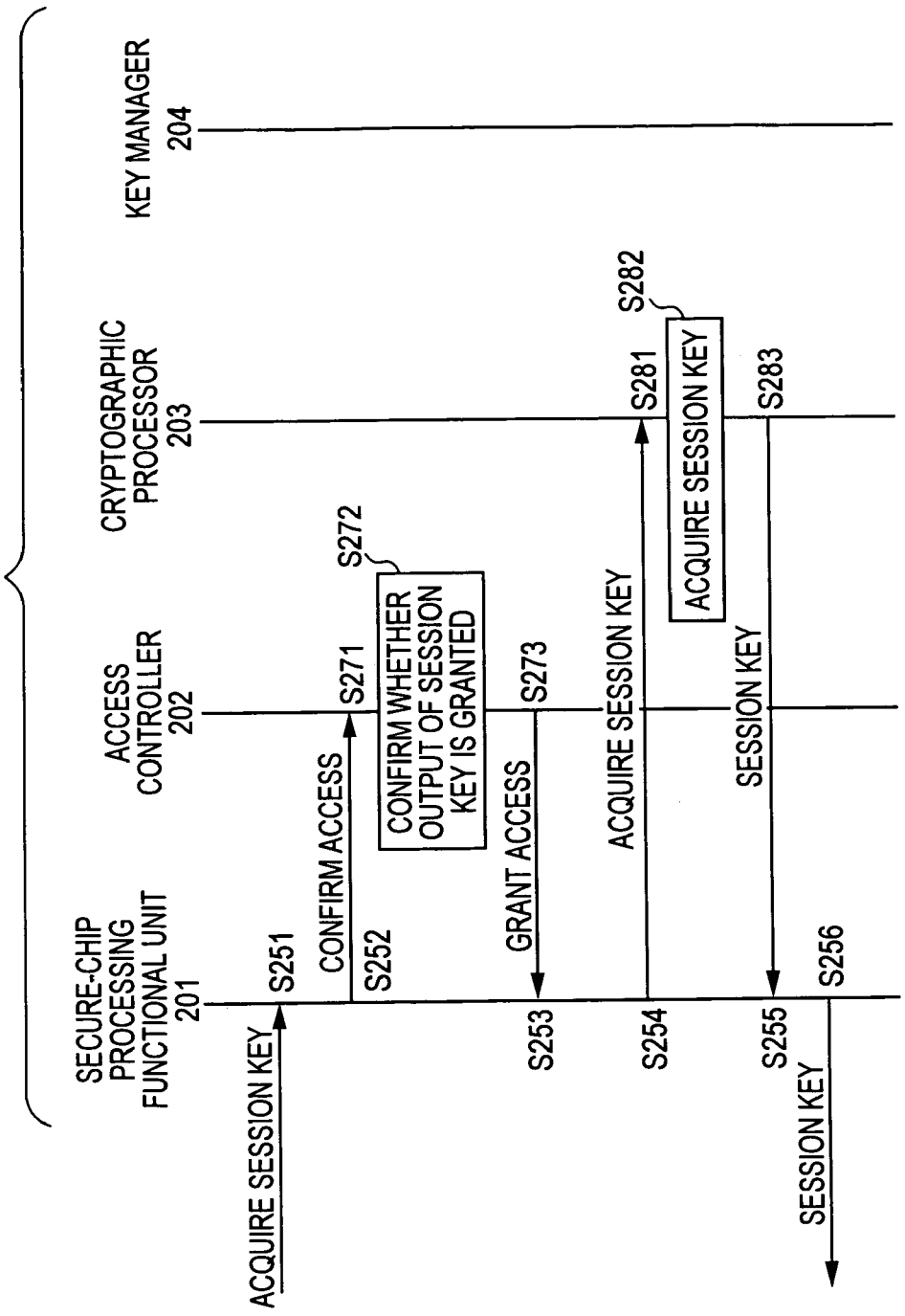
FIG. 17 is a flowchart showing in detail another process in the secure-chip processing module.

Next, a process of acquiring a session key, performed by the secure-chip processing module 53, will be described with reference to a flowchart in FIG. 17. FIG. 17 shows in detail the steps from S159 to S161 in FIG. 14 as steps in the components in the secure-chip processing module 53 in FIG. 15.

In Step S251, the secure-chip processing functional unit 201 receives the request for the session key from the secure-chip manager module 132 (the request in Step S119 in FIG. 14). In Step S252, the secure-chip processing functional unit 201 supplies the request to the access controller 202.

In Step S271, the access controller 202 receives the request from the secure-chip processing functional unit 201. In Step S272, the access controller 202 refers to the access control list to confirm whether output of the session key to the secure-chip manager module 132 is granted.

If the access controller 202 confirms that the output of the session key to the secure-chip manager module 132 is granted, then in Step S273, the access controller 202 indicates to the secure-chip processing functional unit 201 that the output of the session key to the secure-chip manager module 132 is granted.

In Step S253, the secure-chip processing functional unit 201 receives the indication from the access controller 202. In Step S254, the secure-chip processing functional unit 201 requests the cryptographic processor 203 to acquire a session key.

In Step S281, the cryptographic processor 203 receives the request from the secure-chip processing functional unit 201. In Step S282, the cryptographic processor 203 acquires a session key. The cryptographic processor 203 acquires, for example, the random number generated for challenge-and-response authentication as the session key. In Step S283, the cryptographic processor 203 supplies the session key acquired in Step S282 to the secure-chip processing functional unit 201.

In Step S255, the secure-chip processing functional unit 201 receives the session key supplied from the cryptographic processor 203. In Step S256, the secure-chip processing functional unit 201 supplies the session key to the secure-chip manager module 132.

The steps S251, S272, and S256 correspond to the steps from S159 to S161 in FIG. 14, respectively.

Figure 18:
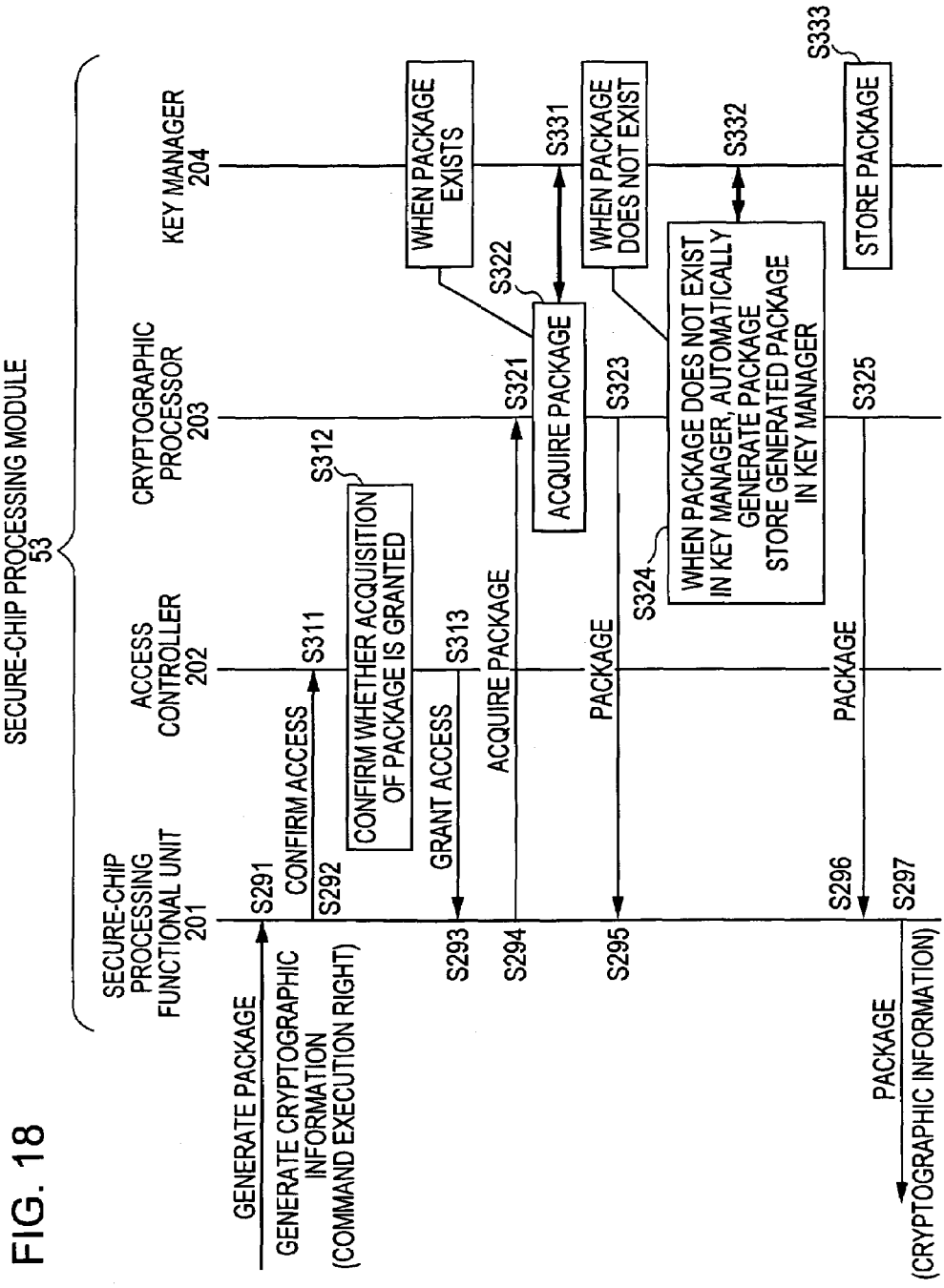
FIG. 18 is a flowchart showing in detail yet another process in the secure-chip processing module.

Next, a process of acquiring a package, performed by the secure-chip processing module 53, will be described with reference to a flowchart in FIG. 18. FIG. 18 shows in detail the steps from S162 to S164 in FIG. 14 as the process of acquiring a package and as steps in the components in the secure-chip processing module 53 in FIG. 15.

In Step S291, the secure-chip processing functional unit 201 receives a request to generate a package from the secure-chip manager module 132 (the request in Step S123 in FIG. 14). In Step S292, the secure-chip processing functional unit 201 supplies the request to the access controller 202.

In Step S311, the access controller 202 receives the request from the secure-chip processing functional unit 201. In Step S312, the access controller 202 refers to the access control list to confirm whether acquisition of a package by the server application 51 is granted (whether creation of the command execution right is granted). If the access controller 202 confirms that the acquisition of a package by the server application 51 is granted, then in Step S313, the access controller 202 indicates to the secure-chip processing functional unit 201 that the acquisition of a package by the server application 51 is granted.

In Step S293, the secure-chip processing functional unit 201 receives the indication from the access controller 202. In Step S294, the secure-chip processing functional unit 201 requests the cryptographic processor 203 to acquire a package.

In Step S321, the cryptographic processor 203 receives the request from the secure-chip processing functional unit 201. In Step S322, the cryptographic processor 203 inquires of the key manager 204 whether the package which the server application 51 (the secure-chip manager module 132) requests has already been generated and is stored in the key manager 204. If the inquiry shows that the package which the server application 51 (the secure-chip manager module 132) requests has already been generated and is stored in the key manager 204, the cryptographic processor 203 acquires the stored package from the key manager 204. The key manager 204 makes a response to the inquiry by the cryptographic processor 203 (Step S331).

In Step S323, the cryptographic processor 203 supplies the package acquired in Step S322 to the secure-chip processing functional unit 201.

In Step S295, the secure-chip processing functional unit 201 receives the package acquired by the cryptographic processor 203.

If the inquiry shows that the package which the secure-chip manager module 132 requests has not been generated and is not stored in the key manager 204, in Step S324, the cryptographic processor 203 generates the package which the secure-chip manager module 132 requests. Specifically, the cryptographic processor 203 encrypts a warrant indicating the execution right with the key acquired from the key manager 204 to generate the cryptographic information, and adds a certificate verifying the validity of the warrant to the generated cryptographic information to generate the package.

The cryptographic processor 203 supplies the generated package to the key manager 204 that stores the package. In Step S325, the cryptographic processor 203 supplies the generated package to the secure-chip processing functional unit 201.

In Step S332, the key manager 204 receives the package generated by the cryptographic processor 203. In Step S333, the key manager 204 stores the received package. If the generation of the same package is requested again, the stored package is supplied to the secure-chip manager module 132.

In Step S296, the secure-chip processing functional unit 201 receives the package acquired by the cryptographic processor 203. After the secure-chip processing functional unit 201 receives the package in Step S295 or Step S296, then in Step S297, the secure-chip processing functional unit 201 supplies the package to the secure-chip manager module 132.

The processing described above is performed in the components in the secure-chip processing module 53.

The series of processing described above may be performed by hardware or may be performed by software.

When the series of processing described above is to be performed by software, the programs in the software are installed over a network or from a recording medium to a computer included in dedicated hardware or to, for example, a general-purpose personal computer that is capable of installing various programs to execute various functions.

The recording medium may be the removable recording medium 81, such as a magnetic disk (including a flexible disk), an optical disc (including a compact disk-read only memory (CD-ROM) and a digital versatile disk (DVD)), a magneto-optical disk (including a minidisc (MD®)), or a semiconductor memory, which is separated from the apparatus, which is distributed for providing programs to a user, and in which the programs are stored, or may be the ROM 73 or the hard disk 75, which is incorporated in the apparatus in advance and is supplied to the user and in which the programs are stored, as shown in FIG. 6.

The steps described in this specification may be performed in time series in the described order or may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus configured to perform cryptographic processing in response to a request from a server transmitting encrypted information to control an integrated circuit chip, the information processing apparatus comprising:

managing means for managing types of the cryptographic processing granted in accordance with requests, the managing means including means for determining whether a software application of the server should be granted access to a key for generating cryptographic information and access to predetermined cryptographic processing based on information contained in an access control list, the access control list including (1) key access information including a key identifier, a valid period for the key, and a type of cryptographic processing to be granted to the software application, (2) authentication information for the software application including application key information, a valid period for the software application, codes for authentication between the integrated circuit chip and the software application, and a cryptographic processing used, and (3) authentication information for operator access including operator key information, a valid period for the operator, and information indicating a content of access granted to the operator, wherein the valid period for the key, the valid period for the software application, and the valid period for the operator are separate and distinct data fields in the access control list; and output means for performing the predetermined cryptographic processing requested from the server, when the means for determining determines that the access to the requested predetermined cryptographic processing should be granted, to supply information concerning a result of the processing to the server as information to be transmitted to the integrated circuit chip to be controlled.

2. An information processing method of performing cryptographic processing in response to a request from a server transmitting encrypted information to control an integrated circuit chip, the information processing method comprising the steps of:

managing types of the cryptographic processing granted in accordance with requests, the managing step including determining whether a software application of the server should be granted access to a key for generating cryptographic information and access to predetermined cryptographic processing based on information contained in an access control list, the access control list including (1) key access information including a key identifier, a valid period for the key, and a type of cryptographic processing to be granted to the software application, (2) authentication information for the software application including application key information, a valid period for the software application, codes for authentication between the integrated circuit chip and the server, and a cryptographic processing used, and (3) authentication information for operator access including operator key information, a valid period for the operator, and information indicating a content of access granted to the operator, wherein the valid period for the key, the valid period for the software application, and the valid period for the operator are separate and distinct data fields in the access control list; and performing the predetermined cryptographic processing requested from the server, when the determining step determines that the access to the requested predetermined cryptographic processing should be granted, to supply information concerning a result of the cryptographic processing to the server as information to be transmitted to the integrated circuit chip to be controlled.

3. The information processing method of claim 2, wherein the type of cryptographic processing is at least one of two-way/one-way authentication, creation of a command execution right, and encryption of a command.

4. The information processing method of claim 2, wherein the access control list includes a valid period of the access control list, information regarding a number of allowed accesses, an application ID, and an operator ID.

5. The information processing method of claim 2, wherein the application key information in the access control list includes encryption and decryption algorithms used in authentication of the software application and a certificate of a public key.

6. A computer-readable medium storing program instructions that cause a computer to perform cryptographic processing in response to a request from a server transmitting encrypted information to control an integrated circuit chip, the program instructions causing the computer to perform the steps of:

managing types of the cryptographic processing granted in accordance with requests, the managing step including determining whether a software of the server should be granted access to a key for generating cryptographic information and access to predetermined cryptographic processing based on information contained in an access control list, the access control list including (1) key access information including a key identifier, a valid period for the key and a type of cryptographic processing to be granted to the software application, (2) authentication information for the software application including application key information, a valid period for the software application, codes for authentication between the integrated circuit chip and the server, and a cryptographic processing used, and (3) authentication information for operator access including operator key information, a valid period for the operator, and information indicating a content of access granted to the operator, wherein the valid period for the key, the valid period for the software application, and the valid period for the operator are separate and distinct data fields in the access control list; and performing the predetermined cryptographic processing requested from the server, when the determining step determines that the access to the requested predetermined cryptographic processing should be granted, to supply information concerning a result of the cryptographic processing to the server as information to be transmitted to the integrated circuit chip to be controlled.

7. An information processing apparatus configured to perform cryptographic processing in response to a request from a server transmitting encrypted information to control an integrated circuit chip, the information processing apparatus comprising:

a managing unit configured to manage types of the cryptographic processing granted in accordance with requests, the managing unit including a determining unit configured to determine whether a software application of the server should be granted access to a key for generating cryptographic information and access to predetermined cryptographic processing based on information contained in an access control list, the access control list including (1) key access information including a key identifier, a valid period for the key, and a type of cryptographic processing to be granted to the software application, (2) authentication information for the software application including application key information, a valid period for the software application, codes for authentication between the integrated circuit chip and the server, and a cryptographic processing used, and (3) authentication information for operator access including operator key information, a valid period for the operator, and information indicating a content of access granted to the operator, wherein the valid period for the key, the valid period for the software application, and the valid period for the operator are separate and distinct data fields in the access control list; and an output unit configured to perform the predetermined cryptographic processing requested from the server, when the determining unit determines that the access to the requested predetermined cryptographic processing should be granted, to supply information concerning a result of the processing to the server as information to be transmitted to the integrated circuit chip to be controlled.

* * * * *